(12) United States Patent
Walker et al.

(10) Patent No.: US 8,038,527 B2
(45) Date of Patent: Oct. 18, 2011

(54) METHOD AND SYSTEM FOR MANAGING GAME CONFIRMATIONS

(75) Inventors: Jay S. Walker, Ridgefield, CT (US); James A. Jorasch, Stamford, CT (US); Daniel E. Tedesco, Huntington, CT (US); Robert C. Tedesco, Huntington, CT (US)

(73) Assignee: Walker Digital, LLC, Stamford, CT (US)

( * ) Notice: Subject to any disclaimer, the term of this patent is extended or adjusted under 35 U.S.C. 154(b) by 539 days.

(21) Appl. No.: 10/791,028

(22) Filed: Mar. 2, 2004

(65) Prior Publication Data
US 2004/0192434 A1    Sep. 30, 2004

Related U.S. Application Data

(60) Provisional application No. 60/451,973, filed on Mar. 4, 2003.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............... 463/25; 463/16; 463/29; 463/42; 463/20; 705/38; 273/146

(58) Field of Classification Search .............. 463/25
See application file for complete search history.

(56) References Cited

U.S. PATENT DOCUMENTS

| | | | |
|---|---|---|---|
| 4,695,053 A | 9/1987 | Vazquez et al. | |
| 4,760,527 A | 7/1988 | Sidley | |
| 5,290,033 A | 3/1994 | Bittner et al. | |
| 5,415,416 A | 5/1995 | Scagnelli et al. | |
| 5,429,361 A | 7/1995 | Raven et al. | |
| 5,611,730 A | 3/1997 | Weiss | |
| 5,851,147 A | 12/1998 | Stupak et al. | 463/13 |
| 5,873,782 A * | 2/1999 | Hall | 463/25 |
| 5,903,874 A | 5/1999 | Leonard et al. | 705/14 |
| 5,971,849 A | 10/1999 | Falciglia | |
| 6,024,641 A * | 2/2000 | Sarno | 463/17 |
| 6,077,163 A * | 6/2000 | Walker et al. | 463/26 |
| 6,089,975 A | 7/2000 | Dunn | |
| 6,113,495 A | 9/2000 | Walker et al. | |
| 6,126,541 A | 10/2000 | Fuchs | |
| 6,139,495 A | 10/2000 | Walker et al. | |
| 6,176,781 B1 | 1/2001 | Walker et al. | |
| 6,213,877 B1 * | 4/2001 | Walker et al. | 463/26 |

(Continued)

FOREIGN PATENT DOCUMENTS
GB    2393554    3/2004

OTHER PUBLICATIONS

"Betmaker.com", Jul. 21, 2001, [online], [retrieved on Mar. 16, 2005] Retrieved from the Internet <URL:http://www.betmaker.com>.*

(Continued)

*Primary Examiner* — Paul A D'Agostino
(74) *Attorney, Agent, or Firm* — Fincham Downs, LLC

(57) ABSTRACT

In accordance with one or more embodiments, a method for outputting a confirmation message at a gaming device is presented. The method comprises determining whether a trigger condition has occurred, outputting a confirmation message at a gaming device, determining a response to the confirmation message, and initiating play at the gaming device.

16 Claims, 18 Drawing Sheets

U.S. PATENT DOCUMENTS

| | | | |
|---|---|---|---|
| 6,227,446 B1 | 5/2001 | Haney et al. | |
| 6,264,560 B1* | 7/2001 | Goldberg et al. | 463/42 |
| 6,270,411 B1 | 8/2001 | Gura et al. | |
| 6,299,532 B1* | 10/2001 | Smith | 463/13 |
| 6,302,790 B1 | 10/2001 | Brossard | |
| 6,307,956 B1 | 10/2001 | Black | 382/124 |
| 6,336,857 B1* | 1/2002 | McBride | 463/12 |
| 6,409,602 B1 | 6/2002 | Wiltshire et al. | |
| 6,443,841 B1 | 9/2002 | Rossides | |
| 6,454,650 B1* | 9/2002 | Aronin | 463/17 |
| 6,485,367 B1 | 11/2002 | Joshi et al. | |
| 6,511,377 B1 | 1/2003 | Weiss | 463/25 |
| 6,527,638 B1* | 3/2003 | Walker et al. | 463/25 |
| 6,601,848 B1* | 8/2003 | Timmons, Sr. | 273/146 |
| 6,755,741 B1* | 6/2004 | Rafaeli | 463/25 |
| 6,942,574 B1 | 9/2005 | LeMay et al. | |
| 7,210,998 B2* | 5/2007 | Kazaoka et | 463/29 |
| 7,241,221 B1* | 7/2007 | Luciano et al. | 463/20 |
| 2001/0031663 A1* | 10/2001 | Johnson | 463/42 |
| 2001/0036853 A1* | 11/2001 | Thomas | 463/17 |
| 2002/0034981 A1* | 3/2002 | Hisada | 463/42 |
| 2002/0047044 A1 | 4/2002 | Orus et al. | |
| 2002/0073021 A1* | 6/2002 | Ginsberg et al. | 705/38 |
| 2002/0111213 A1* | 8/2002 | McEntee et al. | 463/42 |
| 2002/0142824 A1* | 10/2002 | Kazaoka et al. | 463/16 |
| 2002/0151340 A1* | 10/2002 | Guinn et al. | 463/16 |
| 2003/0040360 A1 | 2/2003 | Kaminkow | |
| 2003/0045344 A1 | 3/2003 | Webb et al. | |
| 2003/0060247 A1* | 3/2003 | Goldberg et al. | 463/1 |
| 2003/0064769 A1 | 4/2003 | Muir | |
| 2003/0096651 A1* | 5/2003 | Black | 463/42 |
| 2003/0119528 A1 | 6/2003 | Pew et al. | |
| 2003/0139214 A1* | 7/2003 | Wolf et al. | 463/42 |
| 2003/0190944 A1* | 10/2003 | Manfredi et al. | 463/20 |
| 2004/0015429 A1* | 1/2004 | Tighe et al. | 705/37 |
| 2004/0029627 A1* | 2/2004 | Hannan et al. | 463/1 |
| 2004/0039701 A1* | 2/2004 | Nakamura et al. | 705/42 |
| 2004/0078208 A1 | 4/2004 | Burwell | |
| 2004/0121841 A1* | 6/2004 | Xidos et al. | 463/40 |

OTHER PUBLICATIONS

Website: "Betting Guide—Parlays", (http //www betus com/English/betting/parlays asp), download date: Feb. 21, 2003.

Website: "Kitchen's Inc windows games", (http www simcon net/jkitchen/wingames htm), download date: Feb. 21, 2003.

Website: "Omni Sportsbook—Offshore Wagering", (http //www omnisportsbook com/English/betting/important asp), download date: Feb. 21, 2003.

Website: "Online Sports Betting Guide—Online gambling source and sportsbook betting information", (http //www betmaker com/InfoCenter/guide/buy-wagering asp), download date: Feb. 21, 2003.

Website: "Place a Wager", (http //www themecasino com/placeawager htm), download date: Feb. 21, 2003.

Website: "Rules and Wagers", (http //www online-casino-lasvegas net/rules htm), download date: Feb. 21, 2003.

Website: "VIP Sports Review", (http www bettorsworld com/web/oddswiz/vipreview shtml), download date: Feb. 21, 2003.

Examiner's Answer for U.S. Appl. No. 10/685,143 mailed Feb. 4, 2009, 13 pp.

Office Action for U.S. Appl. No. 10/685,143 mailed Mar. 19, 2008, 12 pp.

Office Action for U.S. Appl. No. 10/685,143 mailed Dec. 18, 2006, 11 pp.

Office Action for U.S. Appl. No. 10/685,143 mailed Oct. 5, 2005, 9 pp.

Office Action for U.S. Appl. No. 10/685,143 mailed Jan. 21, 2005, 6 pp.

Office Action for U.S. Appl. No. 10/685,143 mailed Aug. 12, 2004, 19 pp.

Office Action for U.S. Appl. No. 11/422,712 mailed Dec. 3, 2008, 8 pp.

Office Action for U.S. Appl. No. 11/422,723 mailed Dec. 9, 2008, 8 pp.

Office Action for U.S. Appl. No. 11/422,734 mailed Dec. 3, 2008, 8 pp.

International Preliminary Examination Report for PCT/US04/06550 completed Oct. 7, 2005, 4 pp.

International Search Report for PCT/US04/06550 mailed May 4, 2005, 4 pp.

Written Opinion for PCT/US04/06550 mailed May 4, 2005, 3 pp.

Office Action for U.S. Appl. No. 11/373,757 mailed Sep. 30, 2008, 10 pp.

* cited by examiner

318 —

| RANDOM NUMBER 500 | OUTCOME 502 |
|---|---|
| 0 TO 10 | BAR, BAR, BAR |
| 11 TO 1,000 | CHERRY, CHERRY, CHERRY |
| 1,001 TO 1,000,000 | ANY, ANY, ANY |

| OUTCOME 600 | PAYOUT 602 |
|---|---|
| BAR, BAR, BAR | 100 |
| CHERRY, CHERRY, CHERRY | 10 |
| ANY, ANY, ANY | 0 |

| PARAMETER TYPE 700 | PARAMETER VALUES 702 | PARAMETER VALUE PROBABILITY 704 | CURRENT VALUE 708 |
|---|---|---|---|
| CARROTS | 8 | 10% | 12 |
| | 10 | 40% | |
| | 12 | 40% | |
| | 15 | 10% | |
| RABBITS | 2 | 25% | 6 |
| | 4 | 50% | |
| | 6 | 25% | |

FIG. 7

| INFORMATION IDENTIFIER 800 | INFORMATION 802 | INFORMATION TYPE 804 |
|---|---|---|
| INFO-1-642985152 | "RABBITS EAT CARROTS FROM THE GARDEN! KEEP SPINNING AT NO EXTRA COST AS LONG AS YOU HAVE A CARROT IN YOUR GARDEN." | RULE |
| INFO-2-642985152 | "GAME COSTS 20 CREDITS. SPIN THE REELS TO DISCOVER BURIED TREASURE. PIRATES CAN STEAL YOUR TREASURE." | COMBO |
| INFO-3-642985152 | "GAME COSTS " (NMBR_OF_LINES_SELECTED) X (WAGER) " CREDITS." | COST |
| INFO-4-642985152 | INFO-1-642985152; INFO-3-642985152 | COMBO |
| INFO-5-642985152 | "WOULD YOU LIKE TO START WITH TWICE AS MANY CARROTS FOR A COST OF ONLY SEVEN CREDITS?" | OFFER |

FIG. 8

| PLAYER IDENTIFIER 900 | NAME 902 | CONTACT INFORMATION 904 | GAMING HISTORY 906 | EXPERIENCE LEVEL 908 | LANGUAGE PREFERENCE 910 |
|---|---|---|---|---|---|
| PLAYER-1-02834555 | ANNE RED | 223 MAIN ST., SPRINGFIELD | 3 | 7 | ENGLISH |
| PLAYER-2-02834555 | JEFF YELLOW | HI_ROLLER@BIZ.COM | 2 | 3 | ENGLISH |
| PLAYER-3-02834555 | JIM BLUE | (703) 555-9989 | 12 | 10 | N/A |
| PLAYER-4-02834555 | ANONYMOUS | N/A | 1 | 1 | ENGLISH |
| PLAYER-5-02834555 | JOHN GREEN | LUCKY CASINO, ROOM 214 | 9 | 5 | SPANISH |
| PLAYER-6-02834555 | MARY PURPLE | N/A | 0 | 2 | GERMAN |

| CRITERIA IDENTIFIER 1000 | CRITERIA 1002 |
|---|---|
| CRIT-1 | COST >= 50 CREDITS |
| CRIT-2 | PLAYER_EXPERIENCE <= 7 |
| CRIT-3 | GAMES_PLAYED_THIS_SESSION <= 3 |

| COLLECT THE FRUIT GAME |
|---|
| • GAME COSTS 20 CREDITS FOR 25 SPINS.<br>• RECEIVE AT LEAST ONE FRUIT PER SPIN. ALL FRUIT IS PLACED IN YOUR BASKET.<br>• AFTER EACH SPIN, FRUIT IN YOUR BASKET CAN RIPEN AND INCREASE IN VALUE, OR SPOIL AND LOSE VALUE.<br>• GAME ENDS WHEN ALL 25 SPINS ARE COMPLETE.<br>• PAYOUTS ARE AWARDED BASED ON THE AMOUNT OF RIPENESS OF FRUIT YOU HAVE IN YOUR BASKET AT THE END OF THE GAME.<br>• YOU HAVE ELECTED TO PLAY 3 LINES.<br>• TOTAL COST: 60 CREDITS. |
| YES, I'LL PLAY!  　　　　　　　　　　　　　NO THANKS |

FIG. 14

METHOD AND SYSTEM FOR MANAGING GAME CONFIRMATIONS

The present Application claims the benefit of U.S. Provisional Application Ser. No. 60/451,973, filed Mar. 4, 2003, entitled "METHOD AND SYSTEM FOR MANAGING GAME CONFIRMATIONS." The entirety of this Provisional Application is incorporated by reference herein for all purposes.

CROSS-REFERENCE TO RELATED APPLICATIONS

This application is related to commonly-owned and co-pending:
(i) U.S. patent application Ser. No. 10/685,143, filed Oct. 14, 2003, entitled "METHOD AND APPARATUS FOR OUTPUTTING A MESSAGE AT A GAME MACHINE"; which claims priority to U.S. Provisional Patent Application No. 60/418,397, filed Oct. 11, 2002, entitled "METHOD AND APPARATUS FOR OUTPUTTING A MESSAGE AT A GAMING DEVICE"; and
(ii) U.S. patent application Ser. No. 10/001,089, filed Nov. 2, 2001, entitled "GAMING DEVICE FOR A FLAT RATE PLAY SESSION AND METHOD OF OPERATING SAME"; which
  (a) claims the benefit of U.S. Provisional Patent Application No. 60/282,792, filed Apr. 10, 2001, entitled "GAMING CONTRACTS"; and
  (b) is a continuation-in-part of U.S. patent application Ser. No. 09/518,760, filed Mar. 3, 2000, entitled "GAMING DEVICE FOR A FLAT RATE PLAY SESSION AND METHOD OF OPERATING SAME," issued on Nov. 20, 2001, as U.S. Pat. No. 6,319,127 B1; which is a continuation of U.S. patent application Ser. No. 08/880,838, filed Jun. 23, 1997, entitled "GAMING DEVICE FOR A FLAT RATE PLAY SESSION AND A METHOD OF OPERATING SAME," issued on Jun. 20, 2000, as U.S. Pat. No. 6,077,163.

The entirety of each of the above applications is incorporated by reference herein for all purposes.

FIELD OF THE INVENTION

The present invention relates to gaming and gaming devices.

BACKGROUND

Gaming devices (e.g., reeled slot machines, video poker machines) generate more than $15 billion per year in revenue for casinos in the United, States alone. This figure accounts for more than half of the gaming revenue for a typical United States casino. The situation is similar in other countries and regions in which gaming devices are popular, such as Australia and Europe. Accordingly, casino operators are interested in increasing the enjoyment of playing gaming devices in order to maintain or increase this level of revenue.

Since casino profits are directly proportional to the amount wagered by patrons, casinos are highly motivated to expand and retain share within their given market. Increased playing duration, average wager, and rates of play by players are all factors that contribute to the profitability of the slot floor of a casino.

One way in which casinos have sought to boost profitability associated with such factors is to make the machines as entertaining as possible. Many techniques are currently used to entertain players at a slot machine, such as attractive colors and graphics, sound effects associated with winning payouts, and jackpots or bonus rounds that offer players the chance to win a large amount of money for only a small wager.

While such efforts have made modern slot machines more entertaining, some types of games have also become more complex. The variations of games and features of all the different game machines available at a single casino can be overwhelming to players. Some types of multi-line and multi-coin formats, for example, may require considerable player experience before the player feels comfortable. Further, to keep experienced and frequent players interested, casinos continually modify and upgrade game machines. While learning a new game, some players may make mistakes such as making a larger wager than intended, or misunderstanding the rules.

BRIEF DESCRIPTION OF THE FIGURES

The accompanying drawings depict some exemplary embodiments of the present invention:

FIG. 5 is a table illustrating an example data structure of a probability database for use in some embodiments of the present invention;

FIG. 6 is a table illustrating an example data structure of a payout database for use in some embodiments of the present invention;

FIG. 7 is a table illustrating an example data structure of a parameter value database for use in some embodiments of the present invention;

FIG. 8 is a table illustrating an example data structure of a confirmation information database for use in some embodiments of the present invention;

FIG. 9 is a table illustrating an example data structure of a player database for use in some embodiments of the present invention;

FIG. 10 is a table illustrating an example data structure of a confirmation criteria database for use in some embodiments of the present invention;

FIG. 14 depicts an example of a confirmation screen displayed at a gaming device if a triggering condition has occurred, for use in some embodiments of the present invention.

DETAILED DESCRIPTION

Figure 1:
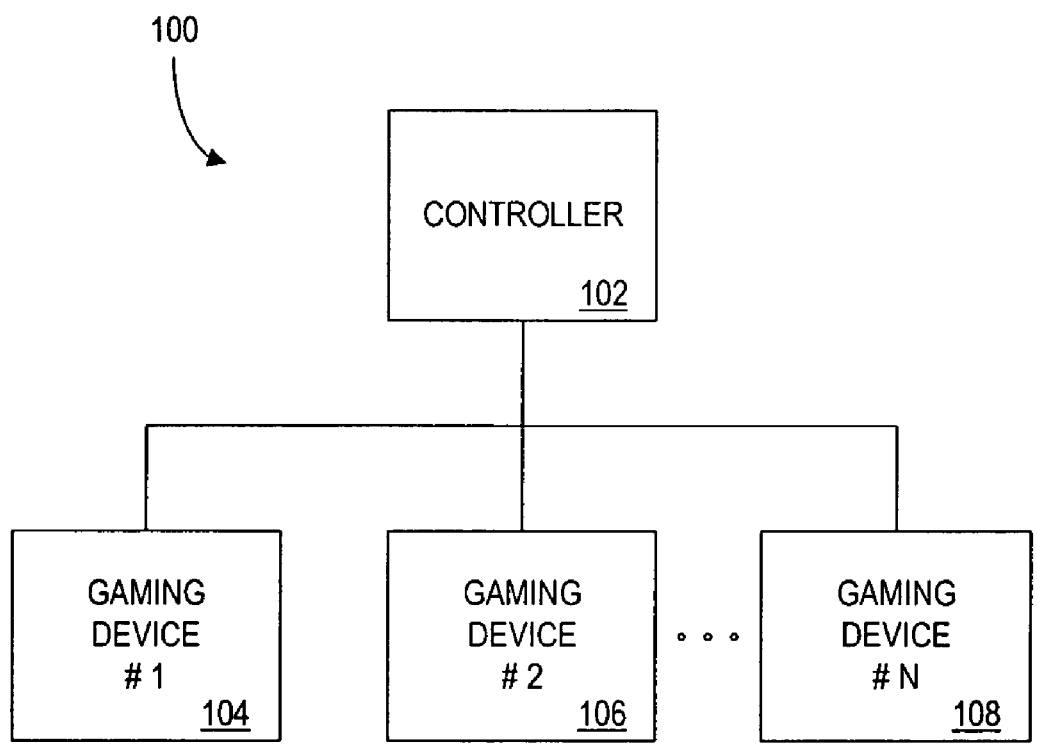
FIG. 1 is a block diagram illustrating an example system according to some embodiments of the present invention.

Some types of players may find it appealing to have the opportunity to "double-check" information about a game or gaming session, such as a wager amount, game parameters, and/or instructions for a game, before fully committing to play. In this way, players can be more certain about what to expect from their gaming experiences. Also, being able to review information about a game may reduce the possibility of player error or misunderstanding about a slot machine game, making the experience more enjoyable for the players, and thereby making the slot machine potentially more profitable for the casino.

Applicants have recognized that there is a need for systems and methods, in accordance with some embodiments of the present invention, to confirm (or attempt to confirm) one or more of: (i) whether a player wishes to make a particular payment (e.g., a wager amount) before initiating or continuing play of a game; (ii) whether a player understands how a game is played before proceeding with play of the game; and (iii) whether a player is aware how long a game may take to play.

Applicants have also recognized that there is a need for systems and methods, in accordance with at least one embodiment, to display (or otherwise communicate) to a player information about how a game is played and/or what type of experience the player should reasonably expect to have playing the game.

Applicants have also recognized that there is a need for systems and methods, in accordance with various embodiments of the present invention, to display (or otherwise communicate) to a player information about a payment amount (e.g., a wager amount) that will be required of the player if the player elects to initiate or continue play of a game. For example, some types of games, such as multi-line slot machines, allow for a wager to be made for each selected payline. Other types of games (or game sessions) may be available on a flat rate basis (e.g., for a determined number of spins, for a period of time). Accordingly, some potential wagers may be quite large. Some types of games require the player to prepay for a gaming session encompassing multiple spins, and the size of the required prepayment may not be fully appreciated by the player before he agrees to play. An inexperienced or inattentive player who elects to play five paylines, or indicates he would like to pre-pay for a one-hour game session, for example, may not appreciate exactly how large a wager will be deducted from his credit balance. Displaying a confirmation screen that indicates the wager amount required to players may help prevent players from making larger wagers than they truly intend, thus reducing player mistakes and frustration. Also, displaying information about how long such a session may take to play may help players understand what the game will be like.

Applicants have also recognized that there is a need for systems and methods, as in some embodiments of the present invention, to allow a player to stop a game from initiating and/or prevent an amount being wagered, even if the player has previously expressed an intent to play the game and/or to make a wager (e.g., by pressing a "Spin" or "Start" button).

Applicants have also recognized that some types of players would find it appealing to be able to stop a game from initiating and/or to prevent an amount being wagered, if the player does not understand or is not confident of his understanding of how the game is played, in accordance with at least one embodiment of the present invention.

Confirmation information screens, in accordance with at least one embodiment, may be particularly useful in casino applications in which players are withdrawing funds from an account via the gaming device, or obtaining credit via the gaming device. As these transactions could represent large dollar amounts, confirmation may be critical in later disputes (e.g., among a player, the casino, and/or a financial institution).

Various embodiments of the present invention allow slot machines and other types of game machines to provide confirmation screens to players in order to reduce player confusion over rules, changes to rules, and other game changes. Confirmation screens may also reduce player confusion over the amount of money being wagered for a particular spin or multi-spin game. A range of types of requested confirmations are possible, including confirming one or more of: (i) that the player has had the opportunity to review instructional information, (ii) that the player has consented to making the wager, (iii) that the player understands the value of certain parameters governing play of a game, (iv) that the player has entered into a binding legal contract (e.g., an agreement to play a prepaid game session for a flat rate cost), and/or (v) that the player is experienced.

At least some embodiments of the present invention thus provide the benefit of allowing a casino to reduce potential player confusion about complex games and/or costs associated with prepaid gaming. As discussed herein, some types of game sessions may comprise a period of time and/or a number of spins, and may require a prepaid wager or be associated with a flat rate cost. Some types of players may find it appealing to be informed or reminded of the cost of a prepaid session before fully committing to such a wager, which may be larger than wagers with which the player is more accustomed (e.g., a wager for a single slot machine spin). Some types of players may also find it appealing to be able to confirm their understanding of or receive information about how long a game may take to play and/or what they might expect from the game experience, before committing to a game session.

Applicants have recognized that some types of casinos or other operators of gaming devices would find it appealing to be able to output appropriate messages in an appropriate way to appropriate players at appropriate times. Various methods are discussed herein for identifying players who would be interested in receiving confirmation messages and/or should receive confirmation messages. Various different types of confirmation messages, beneficial to players, casinos, and other parties, may be presented that are relevant and helpful. In some embodiments, repetitive, annoying, and irrelevant confirmation messages may be filtered or suppressed.

Various embodiments of the present invention provide for a dynamic and flexible system adapted to interact with players on an individual basis by aiding in the management, determination, distribution, and delivery of promotional, instructive, informational, and other types of messages.

Various methods are provided that may be used to ensure that confirmation information is presented at a game machine so as to enhance a player's overall gaming experience. The present invention provides systems and methods useful to selectively output helpful and desirable messages to players, while minimizing interference with the players' gaming and to avoid any irritating "spam" effect created by overwhelming players with unsolicited, unwanted, and/or irrelevant messages.

Various embodiments of the present invention may employ a variety of different methods to output a message to a player at a game machine. For example, messages may be output in pop-up windows, in sidebars, in different colors, in different fonts, in different languages, via a celebrity voice, or in different media formats (e.g., text, audio, video). Outputting a message to a player may include determining how to output the message to the specific player based on preferences, special needs, or other factors.

Various embodiments of the present invention are described herein with reference to the accompanying drawings. The leftmost digit(s) of a reference numeral typically identifies the figure in which the reference numeral first appears.

In the following description, reference is made to the accompanying drawings that form a part hereof, and in which are shown, by way of illustration, specific embodiments in which the invention may be practiced. These embodiments are described in sufficient detail to enable those skilled in the art to practice the invention. It will be understood that other embodiments may be utilized and that structural, logical, software, and electrical changes may be made without departing from the scope of the present invention. The following description is, therefore, not to be taken in a limited sense, and the scope of the present invention is defined by the appended claims.

Throughout the description that follows and unless otherwise indicated, the following terms may include and/or encompass example meanings described herein. These terms and illustrative example meanings are provided to clarify the language selected to describe embodiments of the invention both in the specification and in the appended claims.

The terms "game machine," "gaming device," "game device," and "gaming machine" shall be synonymous and may refer to any electrical, mechanical, electro-mechanical, software, combination thereof, and/or other device that may accept a wager, may follow a process to generate an outcome, and may pay winnings based on the outcome. The outcome may be randomly generated, as with a slot machine; may be generated through a combination of randomness and user skill, as with video poker; or may be generated entirely through user skill. A gaming device may include any gaming machine and/or system, including slot machines, video poker machines, video bingo machines, video roulette machines, video keno machines, keno terminals, pachinko machines, video blackjack machines, arcade games, video games, pinball machines, skill crane machines, video lottery terminals, online gaming systems, game consoles, personal computers logged into online gaming sites, gaming device simulations, sports or race betting machine, etc. Gaming devices may or may not be owned and/or maintained by a casino and/or may or may not exist within a casino location. Gaming devices may be activated by a player pressing a spin button (including buttons labeled "bet", "wager", "deal", "start", "go", "hit", and/or the like), pulling a handle, and/or any other method to initiate the generation of an outcome. In some embodiments, game machines may include communications facilities. In embodiments of the invention addressing table game play such as blackjack, craps, roulette, baccarat, Keno, Bingo, and the like, a game machine may comprise hardware located at the game table suitable for displaying a message to a player.

The term "outcome" shall refer to a result of a game or gaming event. Outcomes may include, for example, "CHERRY-CHERRY-CHERRY" in a slot machine game, a push in blackjack, a flush in video poker, the completion of a puzzle, the accumulation of a plurality of game symbols, the attainment of a goal, and the like. Different types of gaming devices may have widely varying types of outcomes. Various types of outcomes and gaming devices are described herein, and others will be readily apparent to those of skill in the art in light of the present disclosure.

The term "payout" may refer to a prize, reward, winnings, benefit, and/or bonus that is provided to a player based on the outcome of a game. A payout may comprise any form of consideration, including money, products (e.g., a new car, a hotel room for the night, dinner, a shoe shine, tickets to a show), and alternate currencies (e.g., comp points, frequent flyer miles).

The term "game" may refer to a gambling event or activity with a beginning and an end. The activity may encompass and/or may be defined by a number of spins and/or period of time. Some games may have a beginning and/or an end that is defined by a rule, condition, or is triggered. The beginning or end of a game may be indefinite, indeterminate, or variable. For example, a game may end when a game parameter has a particular value (e.g., when the player runs out of a particular collected game symbol), but exactly what time the game will end (e.g., when the parameter will have that particular value), and/or how many spins the game may encompass, may be indefinite. Of course, the end of some types of such games, even if indefinite or not yet determined, may be statistically predictable. The end of a game may be determined voluntarily (i.e., the player elects to stop play) and/or involuntarily (i.e., the player does not elect to stop play), such as by a gaming device or controller. Some types of games may have more than one state or stage (e.g., a first stage involving a first set of reel symbols and a second stage involving a second set of reel symbols; a basic game stage and a bonus game stage).

The terms "session," "game session," "gaming session," and "play session" shall be synonymous and may refer to a series of plays and/or games. Play during a gaming session may take place at one gaming device, at multiple gaming devices, and/or during a continuous period of time (e.g., in a casino location). As with a game, a gaming session may end voluntarily or involuntarily. The end of a game session, as discussed herein, may be defined, for example, by a number of handle pulls, by a period of time, by the accomplishment of one or more objectives, by the occurrence of a trigger or event, by the satisfaction of one or more conditions, and/or by a game parameter becoming associated with a particular value. A session might be purchased by means of purchasing a contract from a casino, wherein the contract specifies terms such as, for example, a price to be paid by the purchaser for the contract, a duration of play of a gaming device, and a threshold of credits above which the player may collect winnings from a gaming device. Apparatus and methods which, among other things, permit and enable various ways of providing prepaid sessions, contract play, or other types of gaming sessions for a flat rate price, and which are appropriate for use in accordance with the present invention are disclosed in pending U.S. patent application Ser. No. 10/001,089, filed Nov. 2, 2001, entitled "GAME MACHINE FOR A FLAT RATE PLAY SESSION AND METHOD OF OPERATING SAME," the entirety of which is incorporated herein by reference for all purposes.

The term "prepaid session" may refer to a period of time and/or a number of plays paid for in advance. Once a session is prepaid, the player typically does not need to supply any additional funds until the session has completed. A prepaid session may allow the player to complete many games (including any number of basic and/or primary games) and/or handle pulls during the session.

The terms "basic game," "basic mode," and "primary game" shall be synonymous and may refer to play that includes the spinning of standard physical or graphical slot reels, the dealing of physical or electronic cards, or various other game outcomes. The outcome of a basic game might be, for example, "CHERRY-CHERRY-BAR," four hits on a seven-spot keno ticket, or a hand of "Ks Qd 4h 2s 6s" in video poker.

The terms "bonus game," "bonus mode," "bonus round," and "secondary game" shall be synonymous and may refer to a game that is separate from a basic game. In a typical bonus game, a player does not have to wager any additional coins. Many bonus games offer the possibility of winning a relatively large number of coins. Typically, a player may be able to qualify to play a bonus game based on one or more outcomes in a primary game, such as in a basic mode or a qualifying mode. A bonus round may be played in accordance with a set of rules that is different from those of a primary game, and may be accompanied by displays, colors, sounds, animated sequences, game play and/or prizes that are not part of the primary game. In some games, a player must achieve a particular outcome (or outcomes) (e.g., a qualifying outcome, a "start-bonus" outcome) during the primary game in order to qualify for entry into a bonus game. In some games, a bonus mode may be automatically initiated upon a player's achieving a winning outcome (or some other qualifying outcome(s)) in a qualifying round. Well-known examples of bonus games associated with games of chance include, without limitation, (i) one or more free spins of a set of reels (that may be different from a set of reels used in a primary slot machine game); (ii) a game requiring a player to select one or more of a plurality of selectable elements (e.g., in order to reveal a bonus prize); (iii) a video, audio and/or animated event that awards a bonus prize to a player based on the event; and (iv) one or more free card games (that may be different from a primary card game). An outcome of a bonus game may comprise one or more types of outcomes typically associated with a basic game (e.g., a reel spin, a hand of cards).

The terms "handle pull" and "spin" shall be synonymous and may refer to an action that initiates a single play at a gaming device. In some embodiments, a handle pull may refer to a single complete game (or hand). In other embodiments, the term may refer to a play related to a single wager. For example, in video blackjack, a user might play a single game in which he splits a pair of sevens, requiring an additional wager. This single game may be considered to include one or multiple handle pulls in accordance with different embodiments.

The term "parameter" may refer to a physical characteristic of a gaming device, its displayed text, graphics, video, audio, games, features, options, or any aspect of the way in which a gaming device operates. For example, the amount of time the gaming device allows its reels to spin after a single handle pull may be a parameter of the gaming device. The sensitivity of a button of the gaming device may be another parameter. A third parameter may be the volume at which the gaming device produces sound. A fourth parameter may be a status of a player selectable mode of operation of the gaming device, e.g., whether a "Betting the Don't," "Auto-Play Mode," and/or a "Jackpot Only" feature is enabled.

The terms "game parameter" and "game play parameter" shall be synonymous and may refer to a parameter or variable related to the experience of playing a game of a gaming device. Game parameters may include, for example, the payout for a particular outcome (e.g., "BAR-BAR-BAR"), the number of "CHERRY" symbols on a particular slot machine reel, and the probability of a game character finding a hidden treasure. In another example, the pace of the game may be considered a game play parameter, whereas the clock speed of the gaming device's processor would likely not be considered a game play parameter.

A "game parameter value" may refer to the value associated with a game parameter. For example, the parameter governing the payout for a "BAR-BAR-BAR" outcome may have a game parameter value of "two hundred coins." In another example, the parameter associated with the number of "CHERRY" symbols on a particular slot machine reel may have a game parameter value of "12." In another example, the parameter governing the probability of a game character finding a hidden treasure may have an associated value of "30%."

The terms "feature" and "option" may be synonymous and may refer to a parameter that may affect how a game operates on a game machine. Features may affect processes like operating a game, displaying game play, determining outcomes, or outputting game results. Features may include modes of operation of a game machine.

The term "game character" may refer to a character involved in the game playing experience. The character may be, for example, a cartoon and/or generated digitally. The character could be represented as a life-like animation of a television character, or even just as audio associated with a well-known character. A game character may be used to entertain the player, explain payouts, steal objects from the player, try to defend objects held by the player, and the like.

The terms "player" and "user" shall be synonymous and may refer to any person or entity that plays or operates a game machine.

The terms "controller," "server," and "casino server" shall be synonymous and may refer to any device that may communicate with one or more game machines, one or more third-party servers, one or more remote controllers, one or more player devices, and/or other network nodes, and may be capable of relaying communications to and from each. A controller may function as a computer server and/or may control the actions of gaming devices.

The term "casino" may refer to the owner of gaming devices, owners' agents, and/or any entity who may profit from players' use of the gaming devices.

The term "casino location" may refer to the physical geographic site, complex, or building where gaming devices owned and/or operated by a casino are located. In the case of an online casino, casino location may refer to the address (e.g., the uniform resource locator (URL)) of the online casino's Web site or facility.

The term "input device" may refer to a device that is used to receive an input. An input device may communicate with or be part of another device such as a point of sale terminal, a point of display terminal, a user terminal, a server, a player device, a gaming device (e.g., a pressure sensor in a "spin" button on a gaming device), a controller, etc. Some examples of input devices include: a "spin" or "deal" button and/or a handle on a gaming device, a bar-code scanner, a magnetic stripe reader (e.g., to read a player tracking card), a computer keyboard, a computer mouse, a point-of-sale terminal keypad, a touch-screen, a microphone, an infrared sensor, a sonic ranger, a computer port, a video camera, a motion detector, a digital camera, a network card, a universal serial bus (USB) port, a GPS receiver, a radio frequency identification (RFID) receiver, an RF receiver, a radio antenna (e.g., for receiving inputs from a second slot machine), a thermometer, a pressure sensor, a biometric input device (e.g., a fingerprint or retinal scanner), a location sensor (e.g., a global positioning system card), a voice recognition module, a coin or bill acceptor, and a weight scale/pressure sensor. For game machines, examples of common input devices include: a button on a video poker machine, a lever on a slot machine, a touch screen on a video poker machine, a magnetic stripe reader to read a player tracking card inserted into a slot machine, and a motion sensor to determine if a player is standing in front of a game machine.

The term "output device" may refer to a device that is used to output information. An output device may communicate with or be part of another device (e.g., a gaming device, a point of sale terminal, a point of display terminal, a player device, a casino device, a controller, etc.). Some possible output devices include: a cathode ray tube (CRT) video monitor, liquid crystal display (LCD) screen, light emitting diode (LED), an LED screen, a printer, an audio speaker, an infrared transmitter/port (e.g., for communicating with a second slot machine), a radio transmitter, an electric motor, a coupon or product dispenser, a Braille computer monitor, a coin or bill dispenser. For game machines, examples of common output devices include: a cathode ray tube (CRT) monitor on a video poker machine; a bell on a slot machine (e.g., rings when a player wins); an LED display of a player's credit balance on a slot machine; an LCD display of a personal digital assistant (PDA) for displaying keno numbers; a printer to provide a cashless gaming receipt; and a progressive jackpot meter bolted onto the top of a game machine.

The term "primary game screen" may refer to a screen or other display device typically used to display game information (e.g., a video representation of one or more spinning reels). A primary game screen, in some embodiments, may be used to display information about primary as well as secondary games.

The term "secondary game screen" may refer to a screen or other display device used in addition to a primary game screen. A secondary game screen may be used, for example, to display information about a secondary game, such as the animation and graphics associated with a bonus round, to display meta-information about a gaming session (e.g., a number of game symbols accumulated by a player over a plurality of handle pulls), or to display confirmation information. Of course, any type of information that may be displayed on a primary game screen may also be displayed on the secondary game screen, in addition to or in lieu of representing such information on the primary game screen, (and vice versa).

The terms "I/0 device" and "input/output device" shall be synonymous and may refer to any combination of input and/or output devices.

The term "peripheral device" may refer to any device operatively connected to a gaming device. A peripheral device may be configured to assist in the operation of various functions, such as game-related functions. Various types of peripheral devices are discussed herein, and others will be readily apparent to those of skill in the art in light of the present disclosure.

The term "player tracking card" may refer to a device that may be capable of identifying and/or storing information about a consumer who is a casino player. Many types of casinos issue player tracking cards to players as a way of identifying the player at a gaming device (e.g., a slot machine) or table game. Typically, player tracking cards may be accessed by gaming devices and by magnetic card readers (e.g., operated by casino staff). The card may be readable by a machine, for example, a gaming device. Some types of player tracking cards store information. The information stored on a player tracking card may include identifying information, as well as financial information, such as a number of gambling credits remaining. According to some embodiments of the present invention, a player tracking card may store player and/or membership and/or player preference information such as a player's desired rate of play. Alternatively, information on the card may merely be a pointer to information stored on a server. Some types of player tracking cards have encoded thereon (in machine-readable and/or human readable form) a player identifier (e.g., a six digit number) which uniquely identifies a player. For example, the player identifier is associated with a record in a database that includes corresponding player information. Some types of player tracking cards may be inserted (e.g., by a player, by a casino employee) into a reader device (e.g., of a slot machine or terminal). A player identifier is read from the card (e.g., magnetically). Based on the player identifier read by the reader device, corresponding player information may in turn be retrieved and/or requested from a database, for example, via a network connection between the reader device and a device hosting the database. Some player tracking cards comprise plastic or paper cards. Other types of player tracking cards and information that may be stored on or accessible using such cards may be described herein, and other types may be readily apparent to those of skill in the art in light of the present disclosure.

The term "gross winnings" may refer to a player's total winnings for a session or time period, without regard to the amounts wagered during the session.

The term "net winnings" may refer to a player's total winnings for a session or time period, less the total amount wagered during that time period.

The terms "products," "goods," "merchandise," and "services" shall be synonymous and may refer to anything licensed, leased, sold, available for sale, available for lease, available for licensing, and/or offered or presented for sale, lease, or licensing including packages of products, subscriptions to products, contracts, information, services, and intangibles.

The term "message" may refer to any communication, in any form, intended to be presented to a player or other party. Messages may be of one or a combination of types. For example, message types may include status messages, confirmation messages, promotional messages, instructive messages, hypothetical information messages, activity-benefit offer messages, and/or communication messages. Combination messages may include messages that fall into multiple categories and/or include multiple types of messages. For example, a message describing a feature and requesting if a player would like to play with the feature enabled may be both a confirmation message and a promotional message.

The term "response" may refer to an indication provided by a player that is based on a message. For example, a message may be a question. A player may provide a response of "Yes" or "No" to the question.

The term "representation" may refer to a method of outputting a message and/or a format in which a message is presented. For example, a message may have a plurality of message representations (e.g., one in English, one in Spanish, one in green, one in yellow, one in audio, etc.).

The term "partition" may refer to a video screen or an area of a video screen that is used to display related information. Some common examples of partitions include windows, split-screen displays, sidebars, headers, and footers.

The term "presenter" may refer to an entity that presents a message to a player via a game machine. For example, a celebrity in a video message may be a presenter, or a cartoon character may present a message to a player.

The term "visual cue" may refer to an aspect of a visual display of a message. Examples of visual cues include color, fonts, window borders, and location.

The term "outputting" may refer to presenting, displaying, revealing, and/or indicating information. Note that outputting a message may include outputting a representation of the message.

The term "trigger" or "trigger condition" may refer to an event or condition that, upon its occurrence or satisfaction, results in a controller outputting a message at a game machine, or performing various other types of actions. For example, a confirmation message may be output to a player when the player presses a "Start Game" button on a game machine in a system, where "request to start play" is specified as an occurrence of a trigger condition.

The term "factor" may refer to information that may affect a process. For example, various factors may affect whether a trigger condition occurs, or whether a message is output to a player.

The terms "suppressing" and "suppression" may refer to preventing, canceling, delaying, or not outputting information. For example, a message may be suppressed if it is not relevant to a particular player and should not be output.

The term "suppression condition" may refer to a condition that, upon its occurrence or satisfaction, results in a controller and/or a game machine suppressing a message. For example, a confirmation message may be suppressed if a player has played a type of multi-line slot machine game more than three times in a game system where "multi-line game format played more than three times" is specified as an occurrence of a suppression condition.

The term "confirmation information" may refer to any type of information that has been or may be communicated to a player (e.g., displayed on a screen of a gaming device) for use in (i) requesting that the player confirm the player's acceptance or understanding of the information (e.g., the value of one or more game parameters) and/(ii) requesting the player's approval to initiate or continue one or more actions or activities (e.g., initiating a handle pull, decrementing a credit balance by the cost of a game play). For example, confirmation information may include an indication of a cost to a player for a prepaid session, a rule of a game, a game parameter value, or any combination thereof.

The terms "confirmation message" and "confirmation request" shall be synonymous and may refer to any communication to the player that includes confirmation information, regardless of the manner of communication. A confirmation message may be represented or formatted in various ways and may include, without limitation, animation, text, video images, still images, and audio. A confirmation message preferably includes an indication or prompt to the player to provide a response to the message. For example, according to some embodiments, a player may be able to respond to a confirmation request by: (i) indicating a desire or intent to initiate or continue play; (ii) indicating that he does not want to initiate or continue play; (iii) indicting that he understands the confirmation information; (iv) indicating that he does not understand the confirmation information; (v) indicating that he would like to make an indicated wager; (vi) indicating that he would not like to make an indicated wager; and/or (vii) indicating that he would like to receive additional information. Some types of displayed confirmation messages may include one or more menu options or buttons corresponding to various response options that may be selected by the player (e.g., by touching a touch screen, by selecting with a pointer device, by saying a number or word associated with an option into a microphone).

The terms "confirmation screen" and "confirmation page" shall be synonymous and may refer to a representation of confirmation information displayed by a device. For example, a confirmation screen may refer to a pop-up message window including a request to a user to confirm acceptance or understanding of displayed information. A confirmation screen may comprise a partition. A confirmation screen may be presented, for example, at a device or display area designated for confirmation messages. Alternatively, or in addition, a confirmation screen may refer to a physical display device (e.g., an LCD panel screen) used to present confirmation information.

1. SYSTEM

An example embodiment of the system 100 of the present invention is depicted in FIG. 1. The present invention can be configured to work as a system 100 in a network environment including a controller 102 (e.g., a slot server of a casino) that is in communication, via a communications network, with one or more gaming devices 104, 106, 108 (e.g., slot machines, video poker machines). The controller 102 may communicate with the gaming devices directly or indirectly, via a wired or wireless medium such as the Internet, LAN, WAN or Ethernet, Token Ring, or via any appropriate communications means or combination of communications means. Each of the gaming devices 104, 106, 108 may comprise computers, such as those based on the Intel® Pentium® processor, that are adapted to communicate with the controller 102. Any number and type of devices 104, 106, 108 may be in communication with the controller 102.

Communication between the devices 104, 106, 108 and the controller 102, and among the devices 104, 106, 108, may be direct or indirect, such as over the Internet through a Web site maintained by computer on a remote server or over an on-line data network including commercial on-line service providers, bulletin board systems and the like. In yet other embodiments, the devices 104, 106, 108 may communicate with one another and/or the controller 102 over RF, cable TV, satellite links and the like.

Some, but not all, possible communication networks that may comprise the network or be otherwise part of the system 100 include: a local area network (LAN), a wide area network (WAN), the Internet, a telephone line, a cable line, a radio channel, an optical communications line, and a satellite communications link. Possible communications protocols that may be part of the system include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In some embodiments, a controller 102 may not be necessary and/or may not be preferred. For example, the present invention may, in one or more embodiments, be practiced on a stand-alone gaming device 104 and/or a gaming device 104 in communication only with one or more other gaming devices 106, 108. In such embodiments, any functions described as performed by the controller 102 or data described as stored on the controller 102 may instead be performed by or stored on one or more gaming devices 104, 106, 108.

In operation, the controller 102 and the gaming devices 104 may exchange information about the use of the gaming devices 104 by individual players, data about the players, messages, confirmation information, confirmation criteria, and the like. In embodiments with a third-party server, the controller 102 and/or the gaming devices 104 may exchange information about the use of the gaming devices 104 by individual players, data about the players, messages, confirmation information, confirmation criteria, and the like, via the third-party server. The gaming devices 104 may, for example, provide information related to parameters and conditions to the controller 102 (and/or a third-party server). The gaming devices 104 may further provide gambling performance and player data to the controller 102 (and/or a third-party server). The controller 102 (and/or a third-party server) may provide confirmation information and messages for a player and/or historical information about the player to the gaming devices 104 in the casino location or to remote gaming devices.

It is worthwhile to note that the system 100 (and other systems described herein) may be arranged into a variety of configurations, with functionality residing in various locations. Various types of information may be transmitted between different devices. For example, the controller 102 may control most aspects of outputting a confirmation message. It may determine a message to output (e.g., what information is to be confirmed), determine when to output the message, and determine how to output the message. The message may then be transmitted to a gaming device 104 and output to the player by the gaming device 104.

In some embodiments as indicated above, the controller 102 may reside in a gaming device 104. For example, a gaming device 104 may control most aspects of outputting a confirmation request. A gaming device 104 may not even have a network connection. In some embodiments, a request may be determined by the controller 102, but a gaming device 104 may control when to output the confirmation screen. For example, a gaming device 104 may suppress a message that is transmitted by the controller 102.

In some embodiments, confirmation information may be determined by the controller 102, and the controller 102 may determine a representation for a confirmation message and a trigger condition. This information may be transmitted to a gaming device 104. The gaming device 104 may then output the representation of the message when a trigger condition occurs. In some embodiments, a gaming device 104 may determine that a trigger condition has occurred and query the controller 102 to determine a message or information to output. The controller 102 may then transmit a message to the gaming device 104 for output by the gaming device 104. Note that a wide variety of other configurations are possible, some of which are discussed herein. It should be understood that methods of the invention may be implemented by one or more gaming devices 104, one or more controllers 102, other devices, and/or any combination thereof.

Figure 2:
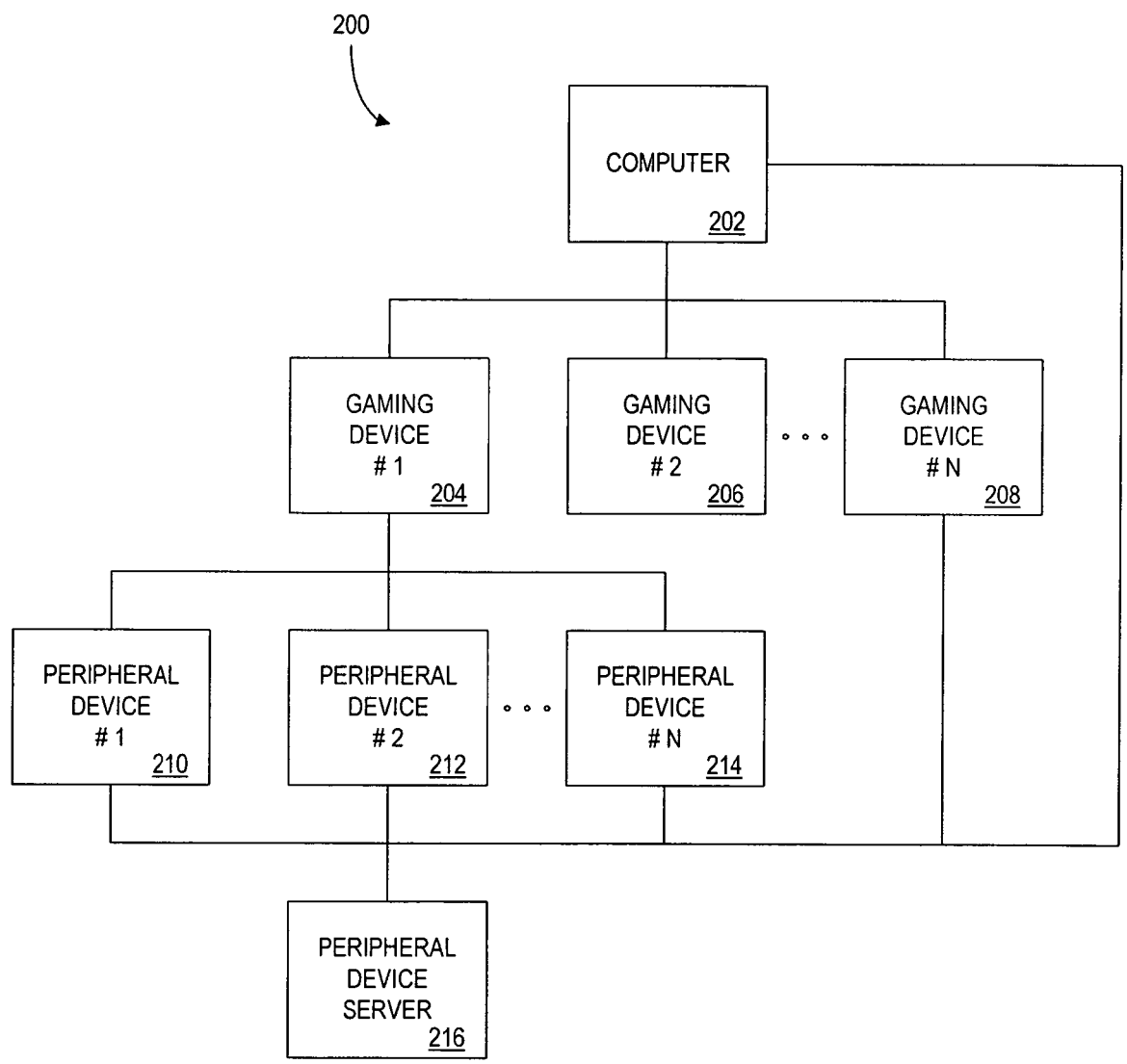
FIG. 2 is a diagram illustrating an example alternative system according to some embodiments of the present invention.

Turning to FIG. 2, an alternative system 200 according to some embodiments of the present invention includes a computer 202 (e.g., a slot server of a casino) that is in communication, via a communications network, with one or more gaming devices 204, 206, 208 (e.g., slot machines, video poker machines). A difference between the aforementioned system 100 and this alternative system 200 is that in this system 200 at least one gaming device 204 is also in communication with one or more peripheral devices 210, 212, 214. A peripheral device 210, 212, 214 may, in turn, be in communication with a peripheral device server 216 and, in some embodiments, with the computer 202. In some embodiments the peripheral device server 216 may be in communication with one or more gaming devices 204, 206, 208 and/or the computer 202.

The computer 202 may communicate with the devices 204, 206, 208 and peripherals 210, 212, 214 directly or indirectly, via a wired or wireless medium such as the Internet, LAN, WAN or Ethernet, Token Ring, or via any appropriate communications means or combination of communications means. For example, the computer 202 may communicate directly with one of the gaming devices 204, 206, 208 (e.g., via a LAN) and indirectly (e.g., via a gaming device) with a peripheral device 210, 212, 214. In another example, the computer 202 may communicate with one of the gaming devices 204 via a LAN and with another of the gaming devices 208 via the Internet (e.g., if the particular gaming device 208 comprises a personal computer in communication with an online casino).

Each of the devices 202, 204, 206, 208, 210, 212, 214, 216 of the system 200 may comprise computers, such as those based on the Intel® Pentium® processor, that are adapted to communicate with the computer. Further, each of the devices 202, 204, 206, 208, 210, 212, 214, 216 may comprise a gaming device such as a mechanical or electronic slot machine, a video poker machine, a video blackjack machine, a video keno machine, a pachinko machine, a video roulette machine, and/or a lottery terminal. Further yet, each of the devices 202, 204, 206, 208, 210, 212, 214, 216 may comprise an external or internal module associated with one or more of the gaming devices 204, 206, 208 that is capable of communicating with one or more of the gaming devices 204, 206, 208 and of directing the one or more gaming devices 204, 206, 208 to perform one or more functions. Any number of devices 204, 206, 208, 210, 212, 214, 216 may be in communication with the computer 202. Any number and type of peripheral devices 210, 212, 214 may be in communication with a gaming device 204, peripheral device server 216 and the computer 202.

Communication between the devices 204, 206, 208, 210, 212, 214 and the computer 202, between each of the devices 204, 206, 208, 210, 212, 214, between the peripheral device server 216 and the devices 204, 206, 208, 210, 212, 214, and between the peripheral device server 216 and the computer 202, may be direct or indirect, such as over the Internet through a Web site maintained by the computer 202 on a remote server or over an on-line data network including commercial on-line service providers, bulletin board systems and the like. In yet other embodiments, any and all of the devices 202, 204, 206, 208, 210, 212, 214, 216 of the system 200 (i.e., the devices 204, 206, 208, 210, 212, 214, the computer 202, and the peripheral device server 216) may communicate with one another over RF, cable TV, satellite links and the like.

Some, but not all, possible communication networks that may comprise the network or otherwise be part of the system include: a local area network (LAN), a wide area network (WAN), the Internet, a telephone line, a cable line, a radio channel, an optical communications line, a satellite communications link. Possible communications protocols that may be part of the system include: Ethernet (or IEEE 802.3), SAP, ATP, Bluetooth™, and TCP/IP. Communication may be encrypted to ensure privacy and prevent fraud in any of a variety of ways well known in the art.

In some embodiments, the computer 202 may not be necessary and/or preferred. For example, the present invention may, in one or more embodiments, be practiced on a standalone gaming device 204, one or more gaming devices 204, 206, 208 in communication with one or more peripheral devices 210, 212, 214, one or more gaming devices 204, 206, 208 in communication with a peripheral device server 216, one or more peripheral devices 210, 212, 214 in communication with a peripheral device server 216, and/or a gaming device 208 in communication only with one or more other gaming devices 204, 206. In such embodiments, any functions described as performed by the computer 202 or data described as stored in a memory of the computer 202 may instead be performed by or stored on one or more gaming devices 204, 206, 208, one or more peripheral devices 210, 212, 214, and/or peripheral device server 216.

Similarly, a peripheral device server 216 may not be desired and/or needed in some embodiments of the present invention. In embodiments that do not involve a peripheral device server 216, any or all of the functions described herein as being performed by a peripheral device server 216 may instead be performed by another server computer, the computer 202, one or more gaming devices 204, 206, 208, one or more peripheral devices 210, 212, 214, or a combination thereof. Similarly, in embodiments that do not involve a peripheral device server 216 any data described herein as being stored in a memory of a peripheral device server 216 may instead be stored in a memory of another server computer, the computer 202, one or more gaming devices 204, 206, 208, one or more peripheral devices 210, 212, 214, or a combination thereof.

Any or all of the gaming devices 204, 206, 208 may, respectively, include or be in communication with a peripheral device 210. A peripheral device 210 may be a device that receives information from (and/or transmits information to) one or more gaming devices 204, 206, 208. For example, a peripheral device 210 may be operable to receive information about games being played on a gaming device 204, such as the initiation of a game and/or a random number that has been generated for a game.

In one or more embodiments, one or more such peripheral devices 210, 212, 214 may be in communication with a peripheral device server 216. This allows the peripheral device server 216 to receive information regarding a plurality of games being played on a plurality of gaming devices 204, 206, 208. The peripheral device server 216, in turn, may be in communication with the computer 202. It should be understood that any functions described herein as performed by a peripheral device 210 may also or instead be performed by the peripheral device server 216. Similarly, any data described herein as being stored on or accessed by a peripheral device 210 may also or instead be stored on or accessed by the peripheral device server 216.

A peripheral device 210 may be operable to access a database (e.g., of a peripheral device server 216) to provide benefits (e.g., cashless gaming receipts) based on, for example, an actual outcome of a game.

The peripheral device server 216 may also monitor player gambling history over time by associating gambling behavior with player identifiers, such as player tracking card numbers. For example, information about the player obtained or accessed by a peripheral device server 216 may be analyzed, e.g., to identify those players that a particular gaming machine owner, operator, or manufacturer finds most desirable. Based upon desired objectives, the peripheral device server 216 may direct the appropriate peripheral device 210 to issue customized messages, offers, and games to specific players.

Information received by a peripheral device 210 from a gaming device 204 may include gambling data such as number of games initiated per unit of time, outcomes displayed for games initiated, payouts corresponding to outcomes displayed, a credit meter balance of the gaming device 204, and/or data associated with the player currently playing the gaming device 204.

The functions described herein as being performed by a peripheral device server 216 and/or a peripheral device 210 may, in one or more embodiments, be performed by the computer 202 (in lieu of or in conjunction with being performed by a peripheral device server 216 and/or a peripheral device 210).

In some embodiments, a peripheral device 210 may be useful for implementing the embodiments of the present invention into the operation of a conventional gaming device. For example, in order to avoid or minimize the necessity of modifying or replacing a program already stored in a memory of a conventional gaming device, an external or internal module that comprises a peripheral device 210 may be inserted in or associated with a conventional gaming device to transform it into a gaming device 204 of the present invention.

Thus, for example, a peripheral device 210 may be utilized to monitor play of the gaming device 204 and output messages and an outcome of a game. In such embodiments the gaming device 204 with which the peripheral device 210 is in communication may continue to operate conventionally. In such embodiments the gaming device 204 may continue to output an outcome for each game played. The peripheral device 210, however, may output a second outcome or payout when appropriate. The peripheral device 210 may also output messages to the player. The peripheral device 210 may also provide benefits to a player (e.g., coins, tokens, electronic credits, paper receipts exchangeable for cash, services, and/or merchandise).

Accordingly, a peripheral device 210 may include (i) a communications port (e.g., for communicating with one or more gaming devices, peripheral device server, another peripheral device, and/or computer; (ii) a display (e.g., for displaying messages and/or outcomes and payouts), (iii) another output means (e.g., a speaker, light, or motion device to communicate with a player), and/or (iv) a benefit providing means (e.g., a printer and paper dispensing means, a credit meter, and/or a hopper and hopper controller).

In some embodiments, a peripheral device 210 may not output outcomes and/or messages to a player but may instead direct the processor 300 of a gaming device 104 to perform such functions. For example, a program stored in a memory of peripheral device 210 may cause a processor 300 of a gaming device 104 to perform certain functions. For example, a program stored in a memory of peripheral device 210 may cause a processor 300 of a gaming device 104 to output an outcome, determine an outcome, output a message, access a database, provide a benefit, refrain from providing a benefit (e.g., by not sending a signal to a hopper controller of the gaming device when it otherwise normally would), and/or communicate with another device. Examples of peripheral devices 210, 212, 214 include (1) electronic apparatuses "retrofitted" to conventional gaming devices so that inventive processes disclosed herein may be realized through game play at the gaming device 104, (2) Personal Digital Assistants such as those manufactured by Palm, Inc., (3) lap top computers, (4) cellular telephones, (5) pagers, or (6) any combination thereof.

2. DEVICES

2.1. Gaming Device

Figure 3:
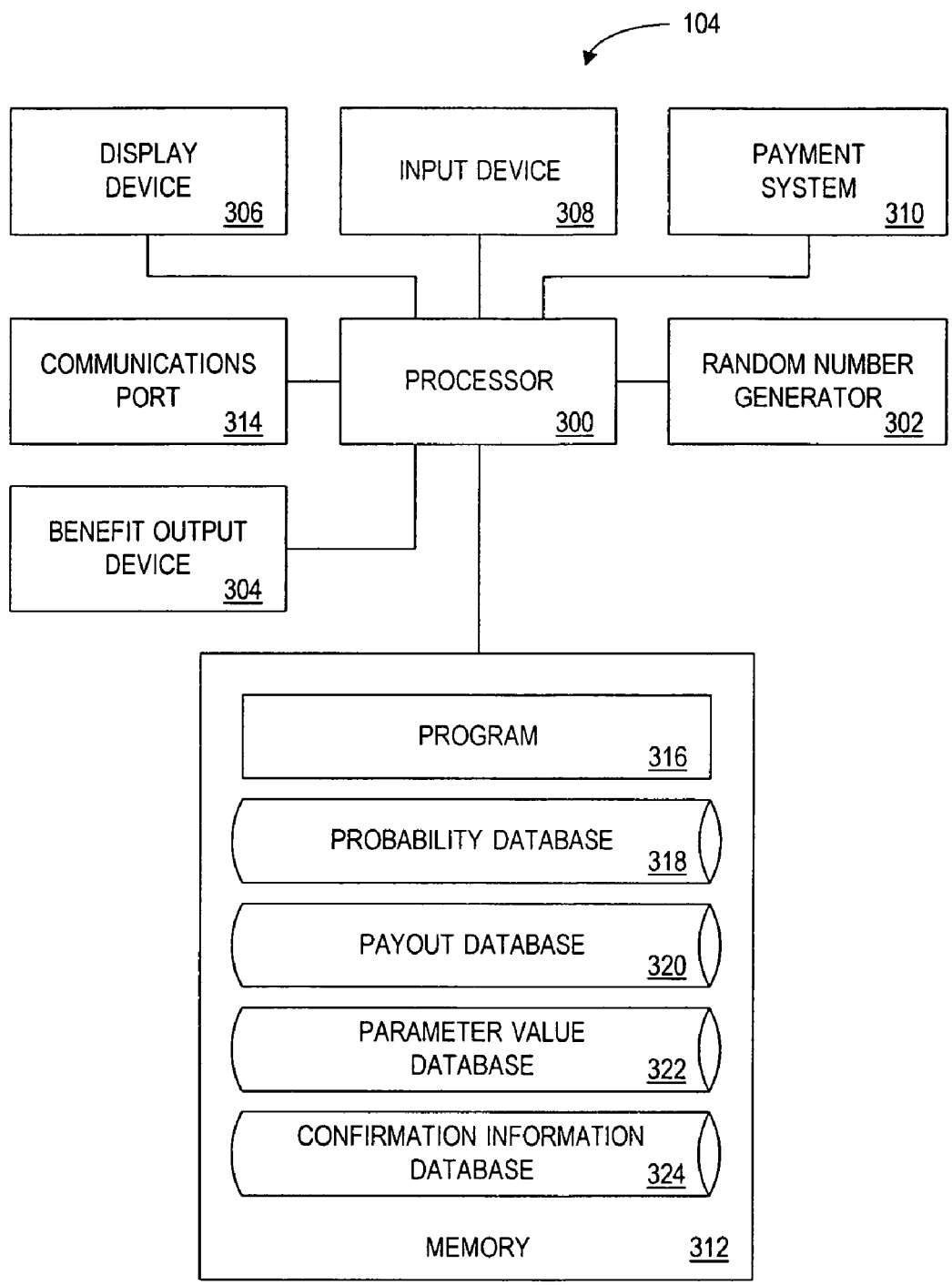
FIG. 3 is a diagram illustrating an example gaming device according to some embodiments of the present invention.

Turning to FIG. 3, a gaming device 104, 204 may be implemented as a system controller, a dedicated hardware circuit, an appropriately programmed general-purpose computer, or any other equivalent electronic, mechanical or electro-mechanical device. As indicated above, the gaming device 104 may comprise, for example, a slot machine, a video poker machine, a video blackjack machine, a video keno machine, a video lottery machine, a pachinko machine or a table-top game. In various embodiments, a gaming device 104 may comprise, for example, a personal computer (e.g., which communicates with an online casino Web site), a telephone (e.g., to communicate with an automated sports book that provides gaming services), or a portable handheld gaming device (e.g., a personal digital assistant or Nintendo GameBoy®). The gaming device 104 may comprise any or all of the gaming devices of the aforementioned systems. In some embodiments, a user device such as a PDA or cell phone may be used in place of, or in addition to, some or all of the gaming device components. Further, a gaming device 104 may comprise a personal computer or other device operable to communicate with an online casino and facilitate game play at the online casino. In one or more embodiments, the gaming device 104 may comprise a computing device operable to execute software that simulates play of a reeled slot machine game, video poker game, video blackjack game, video keno game, video roulette game, or lottery game.

In some embodiments, a gaming device 104 may comprise a processor 300, such as one or more Intel® Pentium® processors. The processor 300 is operable to communicate with a random number generator 302, which may be a component of the gaming device 104. The random number generator 302, in accordance with some embodiments of the present invention, may generate data representing random or pseudo-random values (referred to as "random numbers" herein). The random number generator 302 may generate a random number every predetermined unit of time (e.g., every thousandth of a second) or in response to an initiation of a game on the gaming device 104. In some embodiments, the generated random numbers may be used as they are generated (e.g., the random number generated at substantially the time of game initiation is used for that game) and/or stored for future use. A random number generated by the random number generator 302 may be used by the processor 300 to determine, for example, at least one of an outcome and payout. A random number generator 302, as used herein, may be embodied as a processor separate from but working in cooperation with the processor 300. Alternatively, the random number generator 302 may be embodied as an algorithm, program component, or software stored in the memory of the gaming device 104 and used to generate a random number.

Note that, although the generation or obtainment of a random number is described herein as involving a random number generator 302 of a gaming device 104, other methods of determining a random number may be employed. For example, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor 300 may also be operable to communicate with a benefit output device 304, which may be a component of gaming device 104. The benefit output device 304 may comprise one or more devices for outputting a benefit to a player of the gaming device. For example, in some embodiments the gaming device 104 may provide coins and/or tokens as a benefit. In such embodiments, the benefit output device 304 may comprise a hopper and hopper controller, for dispensing coins and/or tokens into a coin tray of the gaming device. In another example, the gaming device 104 may provide a receipt or other document on which there is printed an indication of a benefit (e.g., a cashless gaming receipt that has printed thereon a monetary value, which is redeemable for cash in the amount of the monetary value). In such embodiments, the benefit output device 304 may comprise a printing and document dispensing mechanism. In yet another example, the gaming device 104 may provide electronic credits as a benefit (which, e.g., may be subsequently converted to coins and/or tokens and dispensed from a hopper into a coin tray). In such embodiments, the benefit output device 304 may comprise a credit meter balance and/or a processor that manages the number of electronic credits that is indicated on a display of a credit meter balance. In yet another example, the gaming device 104 may credit a monetary amount to a financial account associated with a player as a benefit provided to a player. The financial account may be, for example, a credit card account, a debit account, a charge account, a checking account, or a casino account. In such embodiments, the benefit output device 304 may comprise a device for communicating with a server on which the financial account is maintained.

Note that, in one or more embodiments, the gaming device 104 may include more than one benefit output device 304. For example, the gaming device 104 may include both a hopper and hopper controller combination and a credit meter balance. Such a gaming device 104 may be operable to provide more than one type of benefit to a player of the gaming device 104. A single benefit output device 304 may be operable to output more than one type of benefit. For example, a benefit output device 304 may be operable to increase the balance of credits in a credit meter and communicate with a remote device in order to increase the balance of a financial account associated with a player.

The processor 300 is also operable to communicate with a display device 306, which may be a component of gaming device 104. The display device 306 may comprise, for example, one or more display screens or areas for outputting information related to game play on the gaming device, such as a cathode ray tube (CRT) monitor, liquid crystal display (LCD) screen, or light emitting diode (LED) screen. In one or more embodiments, a gaming device 104 may comprise more than one display device 306. For example, a gaming device may comprise an LCD display for displaying electronic reels and a display area that displays rotating mechanical reels.

The processor 300 may also be in communication with one or more other devices (not pictured) besides the display device 306, for outputting information (e.g., to a player or another device). Such other one or more output devices may also be components of a gaming device 104. Such other one or more output devices may comprise, for example, an audio speaker (e.g., for outputting an outcome or information related thereto, in addition to or in lieu of such information being output via a display device), an infra-red transmitter, a radio transmitter, an electric motor, a printer (e.g., such as for printing cashless gaming vouchers), a coupon or product dispenser, an infra-red port (e.g., for communicating with a second gaming device or a portable device of a player), a Braille computer monitor, and a coin or bill dispenser. For gaming devices 104, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

As indicated above, the display device 306 may comprise, for example, one or more display areas. For example, one of the display areas may display outcomes of games played on the gaming device 104 (e.g., electronic reels of a gaming device). Another of the display areas may display rules for playing a game of the gaming device 104. Yet another of the display areas may display the benefits obtainable by playing a game of the gaming device 104 (e.g., in the form of a payout table). In one or more embodiments, the gaming device 104 may include more than one display device 306, one or more other output devices, or a combination thereof (e.g., two display devices 306 and two audio speakers).

The processor may also be in communication with an input device 308, which is a device that is capable of receiving an input (e.g., from a player or another device) and which may be a component of gaming device 104. An input device 308 may communicate with or be part of another device (e.g., a server 102, a gaming device 104, etc.). Some examples of input devices 308 include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or from a another device such as a smart card or PDA of a player), and a weight scale. For gaming devices 104, common input devices 308 may include a button or touch screen on a video poker machine, a lever or handle connected to the gaming device, a magnetic stripe reader to read a player tracking card inserted into a gaming device, a touch screen for input of player selections during game play, and a coin and bill acceptor.

The processor 300 may also be in communication with a payment system 310, which may be a component of the gaming device. The payment system 310 is a device capable of accepting payment from a player (e.g., a bet or initiation of a balance) and/or providing payment to a player (e.g., a payout). Payment is not limited to money, but may also include other types of consideration, including products, services, and alternate currencies. Exemplary methods of accepting payment by the payment system 310 include (i) receiving hard currency (i.e., coins or bills), and accordingly the payment system 310 may comprise a coin or bill acceptor; (ii) receiving an alternate currency (e.g., a paper cashless gaming voucher, a coupon, a non-negotiable token), and accordingly the payment system may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity (e.g., participating in surveys, monitoring remote images for security purposes, referring friends to the casino).

The processor 300 is in communication with a memory 312 and a communications port 314 (e.g., for communicating with one or more other devices). The memory 312 may comprise an appropriate combination of magnetic, optical and/or semiconductor memory, and may include, for example, Random Access Memory (RAM), Read-Only Memory (ROM), a compact disc and/or a hard disk. The memory 312 may comprise or include any type of computer-readable medium. The processor 300 and the memory 312 may each be, for example: (i) located entirely within a single computer or other device; or (ii) connected to each other by a remote communication medium, such as a serial port cable, telephone line or radio frequency transceiver. In some embodiments, the gaming device 104 may comprise one or more devices that are connected to a remote server computer for maintaining databases.

The memory 312 stores a program 316 for controlling the processor 300. The processor 300 performs instructions of the program 316, and thereby operates in accordance with the present invention, and particularly in accordance with the methods described in detail herein. The program 316 may be stored in a compressed, uncompiled and/or encrypted format. The program 316 furthermore includes program elements that may be necessary, such as an operating system, a database management system and "device drivers" for allowing the processor 300 to interface with computer peripheral devices 302, 304, 306, 308, 310, 312, 314. Appropriate program elements are known to those skilled in the art, and need not be described in detail herein.

The terms "computer-readable medium" or "computer readable media" as used herein may refer to any media or medium that may participate in providing instructions to the processor 300 of the gaming device 104 (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying one or more sequences of one or more instructions to processor 300 (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device 104 (or, e.g., a server 102) can receive the data on the telephone line and use an infrared transmitter to convert the data to an infrared signal. An infrared detector can receive the data carried in the infrared signal and place the data on a system bus for the processor. The system bus carries the data to main memory, from which the processor retrieves and executes the instructions. The instructions received by main memory may optionally be stored in memory either before or after execution by the processor.

In addition, instructions may be received via a communication port 314 as electrical, electromagnetic or optical signals, which are exemplary forms of carrier waves that carry data streams representing various types of information. Thus, the gaming device 104 may obtain instructions in the form of a carrier wave.

According to some embodiments of the present invention, the instructions of the program 316 may be read into a main memory from another computer-readable medium, such from a ROM. Execution of sequences of the instructions in the program 316 causes processor 300 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software. As discussed with respect to aforementioned systems 100, 200, execution of sequences of the instructions in a program 316 of a peripheral device 210 in communication with the gaming device 104 may also cause the processor 300 to perform some of the process steps described herein.

The program 316 may be operative to execute a number of invention-specific, objects, modules and/or subroutines which may include (but are not limited to) one or more routines to identify a player at the gaming device 104; one or more routines to receive information about a user; one or more routines to output requests for confirmation; one or more routines to receive a response to a confirmation message from a user; one or more routines to implement rules regarding adjusting parameters; one or more routines to implement rules regarding outputting confirmation information; one or more routines to implement rules regarding suppressing confirmation messages; one or more routines to adjust parameters; one or more routines to receive confirmation information from a controller 102; one or more routines to receive signals from a controller 102 to adjust parameters; one or more routines to receive signals from a controller 102 to output confirmation information; one or more routines to send information to a controller 102; one or more routines to determine a cost for game play; one or more routines to store player performance information; one or more routines to store player preference information; one or more routines to facilitate and control communications between the gaming device 104 and/or third-party servers; one or more routines to restore the gaming device 104 to using its default parameter values; and/or one or more routines to control databases or software objects that track information regarding users, casinos, merchants supplying prizes, other third-parties, gambling results, other gaming devices, and awarding prizes. Examples of some of these routines and their operation are described below in conjunction with the flowchart depicted in FIG. 11.

The memory 312 may also store one or more databases, including a probability database 318, a payout database 320, a parameter value database 322, and a confirmation message database 324. The program 316 may include instructions for retrieving, manipulating, and storing data in the databases as may be useful in performing various methods of the invention, as will be further described below. Examples of some or all of the data stored in each database 318, 320, 322, 324 is described herein. The described entries of the databases 318, 320, 322, 324 represent exemplary information only; those skilled in the art will understand that the number and content of the entries can be different from those illustrated herein. Further, despite any description of the databases 318, 320, 322, 324 as tables, an object-based model could be used to store and manipulate the data types of the present invention and likewise, object methods or behaviors can be used to implement the processes of the present invention.

Note that, although these databases 318, 320, 322, 324 may be described as being stored in a gaming device 104, in other embodiments of the present invention some or all of these databases 318, 320, 322, 324 may be partially or wholly stored in another device, such as one or more of the peripheral devices 210, 212, 214, the peripheral device server 216 and/or the server controller 102, 202. Further, some or all of the data described as being stored in the databases 318, 320, 322, 324 may be partially or wholly stored (in addition to or in lieu of being stored in the memory 312 of the gaming device 104) in a memory of one or more other devices, such as one or more of the peripheral devices 210, 212, 214, the peripheral device server 216 and/or the server controller 102, 202.

As discussed herein, in at least one embodiment the gaming device 104 may be configured as a slot machine enabled to operate in conjunction with one or more processes the present invention. A more specific description of an exemplary slot machine suitable for use with at least one embodiment of the present invention follows. Of course, where appropriate, the slot machine may include fewer, different and/or additional components besides those discussed in this section. Also, it will be readily understood that some or all of the components and features described with respect to the exemplary slot machine may be used with one or more other types of gaming devices.

Generally, a slot machine comprises a three-reel or five-reel slot machine. The slot machine comprises a display area in which an outcome for a game of the slot machine is displayed to the player. The display area may, for example, be a video display that displays graphical representations of reels. In another example, the display area comprises glass, behind which mechanical reels are located. Within the display area, typically, is at least one payline. In some types of slot machine games, the player may choose to play using one or more available paylines. In accordance with one or more embodiments of the present invention, an outcome of a game comprises a set of symbols displayed along a payline of a reeled slot machine.

The slot machine may further comprise a handle. A player may initiate the movement of the reels in the display area by pulling on the handle. Alternatively, a player may initiate the movement of the reels in the display area by actuating a start button. Either or both of the handle and start button are exemplary embodiments of the input device 308, described herein. However it may be initiated, single play at a slot machine or other type of gaming device may be referred to herein as a "handle pull," whether or not a handle is involved in the play, and whether or not a handle is even included in the gaming device. In some embodiments a handle pull or single play may describe a single complete game and/or a single wager. For example, a handle pull might represent a single spin of the reels and/or a series of reel spins (e.g., which may culminate in a final aggregate outcome). In a video poker embodiment, a handle pull may be associated with the result of a first hand and a second hand, both in the same game.

Where appropriate, the slot machine may also include an alternate, secondary game screen, for outputting information to a player. The secondary game screen may be utilized, for example, to inform a player of game information, provide an offer, output a message, or to indicate which outcome is an actual outcome or that an outcome that is currently being output is not the actual outcome. In another example, a secondary game screen may be used to output confirmation information.

The exemplary slot machine may also include a payment system comprised of a bill acceptor, a credit card reader, and a coin acceptor. A player may utilize the payment system to provide a wager for playing a game or game session. This payment system is an exemplary embodiment of the payment system 310, described herein.

The slot machine may further comprise a credit meter balance, which is an exemplary embodiment of a benefit output device 304 described herein. The credit meter balance reflects the amount of electronic credits currently available to a player. The electronic credits may be used by a player, for example, as wagers for games played on the gaming device. The electronic credits may also be "cashed out" as coins, bills, tokens, a cashless gaming receipt, and/or credits to another financial account associated with the player, as will be readily understood by those skilled in the art.

Finally, the slot machine may comprise a coin tray. As discussed herein, payment to the player may be rendered by dispensing coins into the coin tray. Such coins may be dispensed based on, for example, a player's indication that the player would like to cash out his credit meter balance and/or a payout obtained by a player as a result of playing a game on the slot machine. The coin tray is an exemplary embodiment of the benefit output device 304, described herein.

2.2. Controller

Figure 4:
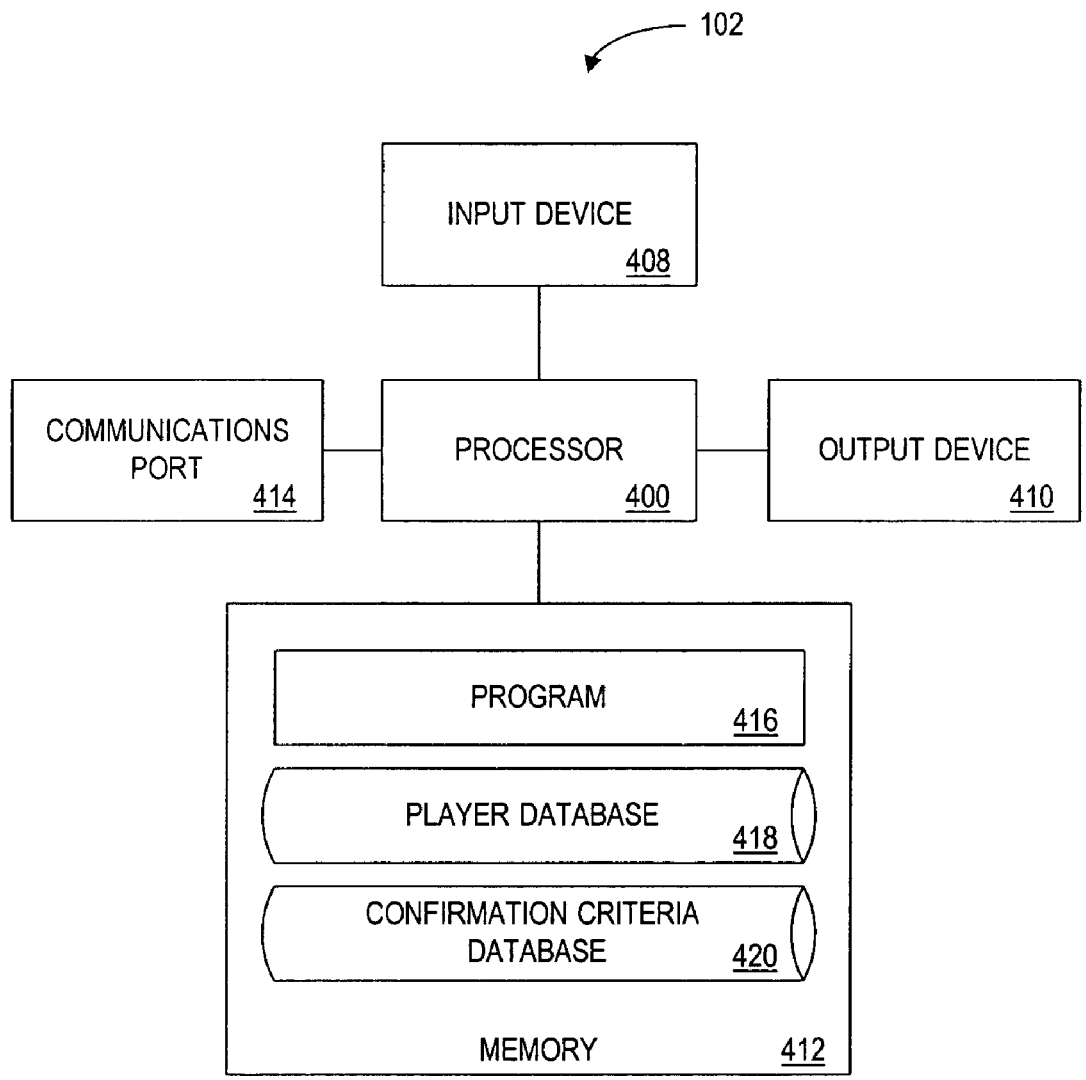
FIG. 4 is a diagram illustrating an example controller according to some embodiments of the present invention.

Referring now to FIG. 4, illustrated therein is a block diagram of an example of controller 102 (FIG. 1) or computer 202 (FIG. 2). The controller 102 may be implemented as a system controller, a dedicated hardware circuit, an appropriately programmed general-purpose computer, or any other equivalent electronic, mechanical or electro-mechanical device. The controller 102 may comprise, for example, a server computer operable to communicate with one or more client devices, such as the gaming device 104, 204. The controller 102 is operative to manage the system 100 and the system 200 and to execute various methods of the present invention.

In operation, the controller 102 may function under the control of a casino, a merchant, or other entity that may also control use of the gaming devices 104, peripheral devices 210, and/or peripheral device server 216. For example, the controller 102 may be a slot server in a casino. In some embodiments, the controller 102 and slot server may be different devices. In some embodiments, the controller 102 may comprise more than one computer operating together. In some embodiments, the controller 102 and peripheral device server 216 may be the same device.

The controller 102 comprises a processor 400, such as one or more Intel® Pentium® or Centrino® processors. The processor 400 is in communication with a memory 412 and one or more communications ports 414 (e.g., for communicating with one or more other devices). The memory 412 may comprise an appropriate combination of magnetic, optical and/or semiconductor memory, and may include, for example, Random Access Memory (RAM), Read-Only Memory (ROM), a compact disc and/or a hard disk. The processor 400 and the memory 412 may each be, for example: (i) located entirely within a single computer or other device; or (ii) connected to each other by a remote communication medium, such as a serial port cable, telephone line or radio frequency transceiver. In one embodiment, the controller 102 may comprise one or more devices that are connected to a remote server computer for maintaining databases.

The memory 412 stores a program 416 for controlling the processor 400. The processor 400 performs instructions of the program 416, and thereby operates in accordance with the present invention, and particularly in accordance with the methods described in detail herein. The program 416 may be stored in a compressed, uncompiled and/or encrypted format. The program 416 furthermore includes program elements that may be necessary, such as an operating system, a database management system and "device drivers" for allowing the processor 400 to interface with computer peripheral devices. Appropriate program elements are known to those skilled in the art, and need not be described in detail herein. In some embodiments, the program 416 may be located remotely from the memory 412 and/or on another server.

The program 416 may be operative to execute a number of invention-specific, objects, modules and/or subroutines which may include (but are not limited to) one or more routines to identify a player at the gaming device 104; one or more routines to receive information about a user; one or more routines to output requests for confirmation; one or more routines to receive a response to a confirmation message from a user; one or more routines to implement rules regarding adjusting parameters; one or more routines to implement rules regarding outputting confirmation information; one or more routines to implement rules regarding suppressing confirmation messages; one or more routines to adjust parameters; one or more routines to receive confirmation information from a gaming device 104 or other device; one or more routines to receive signals from another device to adjust parameters; one or more routines to receive signals from another device (e.g., a peripheral device) to output confirmation information; one or more routines to send information to a gaming device 104; one or more routines to determine a cost for game play; one or more routines to store player information (e.g., player performance information, player preference information); one or more routines to facilitate and control communications between any number of gaming devices and/or third-party servers; one or more routines to restore a gaming device 104 to using its default parameter values; and/or one or more routines to control databases or software objects that track information regarding users, casinos, merchants supplying prizes, other third-parties, gambling results, other gaming devices, and awarding prizes. Examples of some of these routines and their operation are described below in conjunction with the flowchart depicted in FIG. 11.

According to at least one embodiment of the present invention, the instructions of the program 416 may be read into a main memory from another computer-readable medium, such as from a ROM to a RAM. Execution of sequences of the instructions in program 416 causes processor 400 to perform the exemplary process steps described herein. In alternate embodiments, hard-wired circuitry may be used in place of, or in combination with, software instructions for implementation of the processes of the present invention. Thus, embodiments of the present invention are not limited to any specific combination of hardware and software. As discussed with respect to system 200 of FIG. 2, execution of sequences of the instructions in a program of a peripheral device 210 in communication with a gaming device 104 may also cause processor 400 to perform some or all of the process steps described herein.

Various forms of computer-readable media, some of which are discussed herein, may be involved in carrying one or more sequences of one or more instructions to processor 400 (or any other processor of a device described herein) for execution.

The memory 412 also may store one or more databases, including a player database 418 and a confirmation criteria database 420. Each of these databases is described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though six separate databases are illustrated, the invention could be practiced effectively using any number of more or fewer functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention.

Note that, although these databases are described as being stored in a gaming device, in other embodiments of the present invention some or all of these databases may be partially or wholly stored in another device, such as one or more of the peripheral devices 210, the peripheral device server 216, one or more of the gaming devices 104, a slot server (if different from the controller 102), another device, or a combination thereof. Further, some or all of the data described as being stored in the databases 418, 420 may be partially or wholly stored (in addition to or in lieu of being stored in the memory 412 of the controller 102) in a memory of one or more other devices, such as one or more of the peripheral devices 210, one or more of the gaming devices 104, the peripheral device server 216 and/or a slot server (if different from controller 102).

The processor 400 may also include or be in communication with one or more clocks or timers (not shown), one or more input devices 408, and/or one or more output devices 410. Various types of input and output devices are discussed herein, and others will be readily apparent to those having ordinary skill in the art in light of the present disclosure.

3. DATABASES

Although databases 318, 320, 322, 324 are depicted as residing at the gaming device 104 in the example embodiment of FIG. 3, and databases 418, 420 are depicted as residing at the controller 102 in the example embodiment of FIG. 4, it will be understood that one or more of these databases could just as easily be implemented on one or more other devices.

Further, the individual database files could be stored on any number of different devices (e.g., located on different storage devices in different geographic locations, such as on a server 102 or a gaming device 104). For example, a gaming device may store a redundant copy of a controller's databases to protect against data loss or for any number of other reasons, and vice versa.

In embodiments in which, for example, the controller 102 serves/controls multiple casinos operated by different entities, a casino may wish to have a local copy of the portions of the databases that include entries related to that casino and may wish to exclude other casinos' access to that casino's information. Thus, some embodiments of a gaming device 104 may include local copies of some portions of one or more of the databases stored at a controller. Such a redundant configuration may provide enhanced system performance by reducing network communications. A distributed configuration may provide enhanced system security by allowing different casinos to store and maintain their own databases. A gaming device program (e.g., program 316) may include one or more routines to respond to requests from other gaming devices for player data, message data, trigger condition data, representation data, formatting data, queue data, suppression condition data, and message history data. In some embodiments, local versions of the databases are not stored on the gaming devices 104 at all and instead, the game device program accesses casino server databases which are stored and maintained exclusively on the controller 102. Likewise, in some embodiments, the databases may only exist on a third-party server and thus, both the controller 102 and the gaming devices 104 may access a third-party server for the data.

As will be understood by those skilled in the art, the schematic illustrations and accompanying descriptions of the sample databases presented herein are exemplary arrangements for stored representations of information. Other database arrangements may be used which would still be in keeping with the spirit and scope of the present invention. Any number of arrangements may be employed besides those suggested by the accompanying figures. For example, even though a particular number of separate databases are illustrated, various embodiments of the invention could be practiced effectively using any number of functionally equivalent databases. In other words, the present invention could be implemented using any number of different database files or data structures, as opposed to the number depicted. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention. These processes are described below in detail with respect to FIG. 11.

3.1. Probability Database

FIG. 5 depicts a tabular representation of an example of a probability database 318 according to some embodiments of the present invention. Where appropriate, a probability database 318 may be utilized in the performance of the inventive processes described herein. A probability database 318 may be stored in the memory 312 in tabular form, or any other appropriate database form, as is well known in the art. The data stored therein may include a number of exemplary records or entries, each defining a random number. Those skilled in the art will understand that the probability database 318 may include any number of entries. The tabular representation also defines, for each of the entries or records, fields that specify: (i) a random number 500 or range of random numbers that may be generated by the random number generator 302; and (ii) an outcome 502, that indicates the one or more indicia comprising the outcome that corresponds to the random number of a particular record.

A gaming device 104 may utilize a probability database 318 to determine, for example, what outcome corresponds to a random number generated by a random number generator 302 and to display the determined outcome. The outcomes may comprise, for example, the three symbols to be displayed along the payline of a three-reel slot machine.

3.2. Payout Database

FIG. 6 depicts a tabular representation of an example of a probability database 320 according to some embodiments of the present invention. Where appropriate, a payout database 320 may be utilized in the performance of the inventive processes described herein. A payout database 320 may be stored in the memory 312 in tabular form, or any other appropriate database form, as is well known in the art. The data stored therein includes a number of example records or entries, each defining an outcome that may be obtained on a gaming device 104 that corresponds to a payout. Those skilled in the art will understand that the payout database 320 may include any number of entries. The tabular representation also defines fields for each of the entries or records. The fields specify: (i) an outcome 600, which indicates the one or more indicia comprising a given outcome; and (ii) a payout 602 that corresponds to each respective outcome. The outcomes may be those obtained, for example, on a three reel slot machine.

A gaming device 104 may utilize the payout database 320 to determine whether a payout 602 should be output to a player as a result of an outcome 600 obtained for a game. For example, after determining the outcome 600 to output on the gaming device, the gaming device may access the payout database 320 to determine whether the outcome 600 for output is one of the outcomes stored as corresponding to a payout 602, e.g., "BAR, BAR, BAR" or "CHERRY, CHERRY, CHERRY" in FIG. 6. If it is, the gaming device 104 may provide the corresponding payout 602 to the player.

Of course, many other arrangements of the probability database 318 and the payout database 320 are possible. For example, *Winning at Slot Machines*, by Jim Regan (Carol Publishing Group Edition, 1997), illustrates examples of payout and probability tables and how they may be derived. The entirety of this book is incorporated by reference herein for all purposes.

3.3. Parameter Value Database

FIG. 7 depicts a tabular representation of an example of a parameter value database 322 according to some embodiments of the present invention. Where appropriate, a parameter value database 322 may be utilized in the performance of the inventive processes described herein. A parameter value database 322 may be stored in the memory 312 in tabular form, or any other appropriate database form, as is well known in the art. The data stored therein includes a number of example records or entries, each defining the current parameter value associated with a given parameter, as well as possible parameter values and/or the respective probabilities associated with the possible parameter values. Those skilled in the art will understand that the parameter value database 322 may include any number of entries. The tabular representation also defines fields for each of the entries or records. The fields specify: (i) a type of parameter 700; (ii) parameter values 702 that may be associated with the parameter; (iii) probabilities 704 associated with the possible parameter values; and (iv) a current value 708 associated with the corresponding parameter.

According to some embodiments, the parameter value database 322 may include information that indicates a cost (to the player) for changing a value of a corresponding game parameter. For example, the parameter value database 322 may include an indication that it will cost a player ten credits to double the number of a type of game symbol appearing on the reels (e.g., the "Fox" symbol in the confirmation trigger example below). Such costs may be used, for example, in a message comprising an offer to the player to change a game parameter value (e.g., "Would you like to double the number of Foxes for only 5 coins?").

A gaming device 104 may utilize the parameter value database 322, for example, to manage, track, and store parameter values during a gaming session. In accordance with some embodiments, a gaming device 104 may utilize the parameter value database 322 to generate a confirmation screen that asks if a user wishes to continue after a parameter value changes.

3.4. Confirmation Information Database

FIG. 8 depicts a tabular representation of an example of a confirmation information database 324 according to some embodiments of the present invention. This particular tabular representation of a confirmation information database 324 includes sample records or entries that each includes data regarding information that may be output to a player in a confirmation request. In some embodiments of the invention, a confirmation information database 324 is used to store, track, and/or manage confirmation information. Those skilled in the art will recognize that such a confirmation information database 324 may include any number of entries or additional fields.

The particular tabular representation of a confirmation information database 324 depicted in FIG. 8 also defines fields for each of the entries or records. The fields specify: (i) an information identifier field 800 that may store a representation uniquely identifying the confirmation information; (ii) an information field 802 that may store a representation of a description of the information to be output (or, in some embodiments, the actual confirmation message to be output); and (iii) an information type field 804.

As depicted in the tabular representation, information may be of various types, including instructional (e.g., "RULE"), promotional or offer-related (e.g., "OFFER"), cost-related (e.g., "COST"), or any combination of types of information (e.g., "COMBO"). Other types of information are discussed herein, and still other types of confirmation information may be readily apparent to those having ordinary skill in the art. Apparatus and methods which, among other things, permit and enable various ways of communicating various types of messages to players, and which are appropriate for use in accordance with the present invention are disclosed in pending U.S. patent application Ser. No. 10/685,143, filed Oct. 14, 2003, entitled "METHOD AND APPARATUS FOR OUTPUTTING A MESSAGE AT A GAME MACHINE," the entirety of which is incorporated herein by reference for all purposes.

The example confirmation information database 324 depicted in FIG. 8 provides example data to illustrate this database embodiment. An information identifier 800 (e.g., "INFO-1-642985152") may be used to identify and index confirmation information listed in the confirmation information database 324. In one example, "INFO-1-642985152" identifies information that reads "RABBITS EAT CARROTS FROM THE GARDEN! KEEP SPINNING AT NO EXTRA COST AS LONG AS YOU HAVE A CARROT IN YOUR GARDEN." The type of information is "RULE." The information may be used, for example, in a confirmation message output to a player to confirm that the player understands how a game is played before play is initiated.

In another example data entry, "INFO-3-642985152" identifies information about the cost of a game to a player. The type of information is "COST." The information may be used, for example, in a confirmation screen that asks a user to indicate whether or not he would like to initiate play of the game (i.e., whether or not he would like to have the indicated cost deducted from his available credit balance). In other example data entries, each of "INFO-2-642985152" and "INFO-4-642985152" (having type "COMBO") identifies a combination of cost and instructional information.

FIGS. 13A-13E depict examples of confirmation screens presented at a gaming device 104. Each confirmation screen represents exemplary types of information displayed using a display device (e.g., display device 306) of the gaming device 104. The exemplary information and/or any of the exemplary confirmation screens could be stored, for example, in the confirmation information database 324.

Figure 13A:
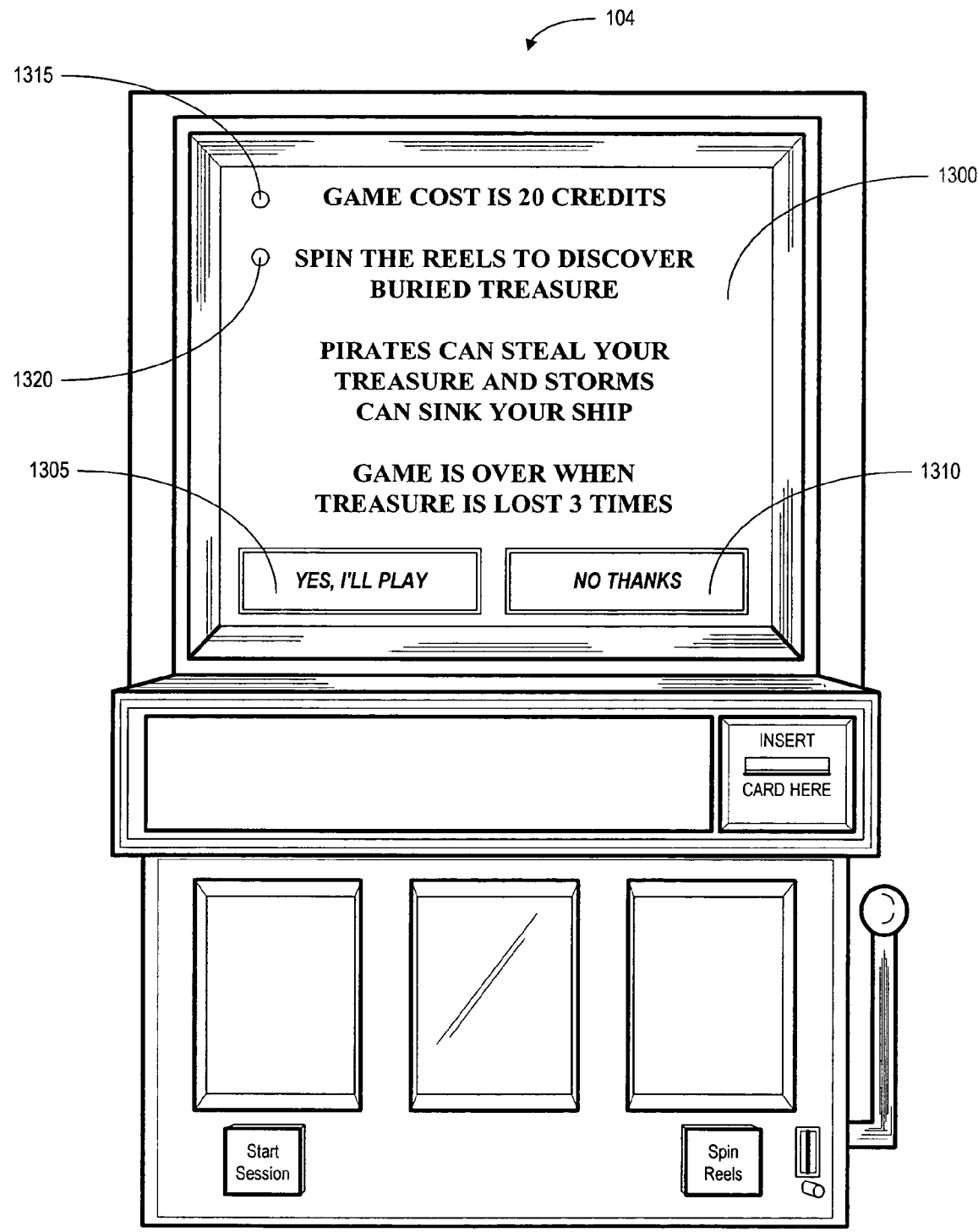
FIGS. 13A-13E depict various examples of confirmation screens displayed at a gaming device for use in some embodiments of the present invention.
Figure 13B:
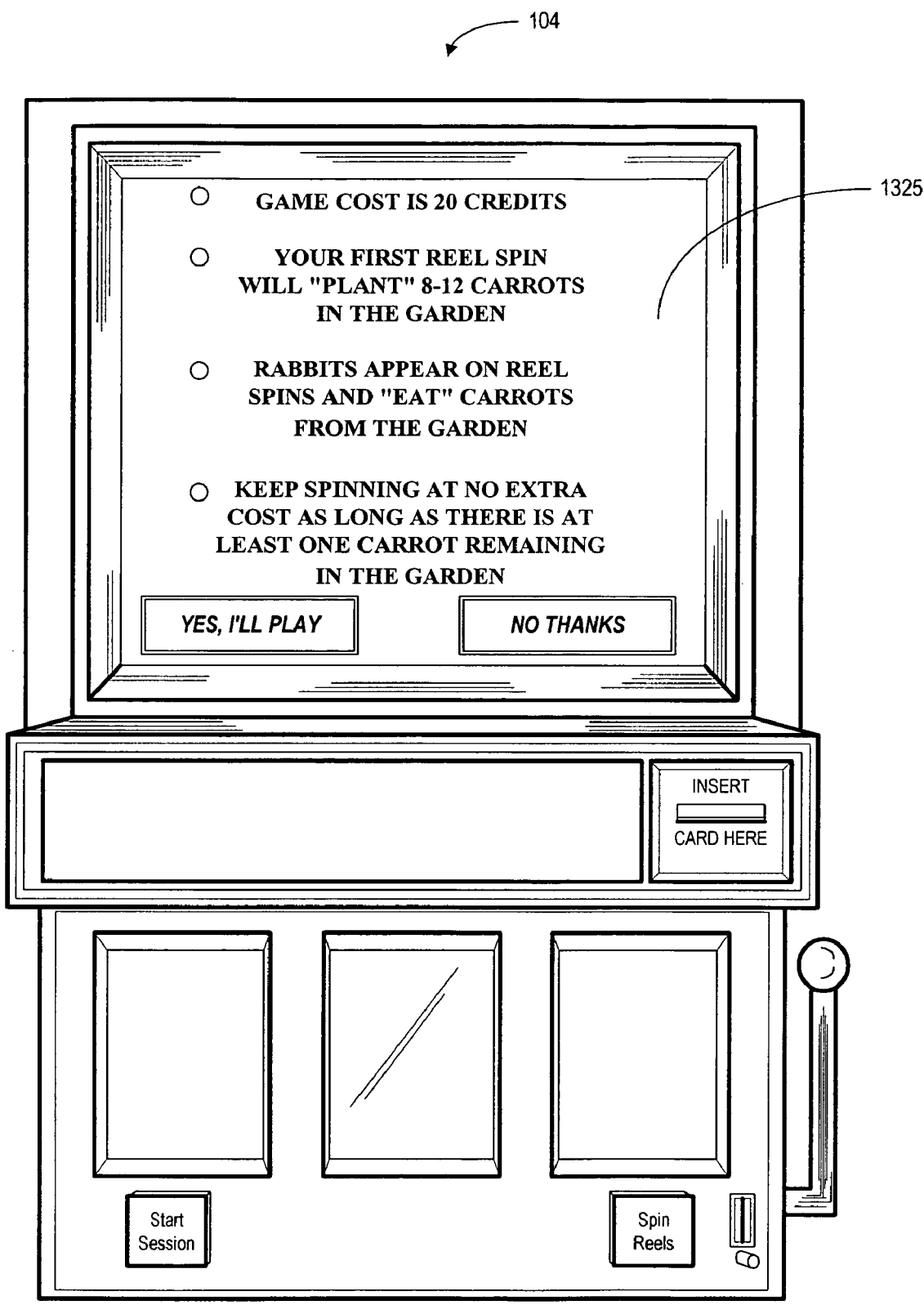

FIG. 13A shows a confirmation screen 1300 that displays confirmation information including cost information 1315 ("GAME COST IS 20 CREDITS") and instructive information 1320 that indicates some of the rules of the game and defines the end of the game. Confirmation screen 1300 further includes a button 1305 labeled "YES, I'LL PLAY" that a user could use to indicate he would like to proceed with play of the gaming device. The confirmation screen 1300 also includes a button 1310 labeled "NO THANKS," that a user could actuate to indicate he would not like to proceed (e.g., if he does not approve of the wager amount or does not understand the game). As discussed herein, either of buttons 1305 and 1310 may be selectable by touch (e.g., if the gaming device 104 comprises a touch screen). FIG. 13B depicts a similar type of confirmation screen 1325 that includes information about the cost of another game involving a virtual carrot garden and rabbit symbols on the slot machine reels, and indicates some of the rules of the game.

Figure 13C:
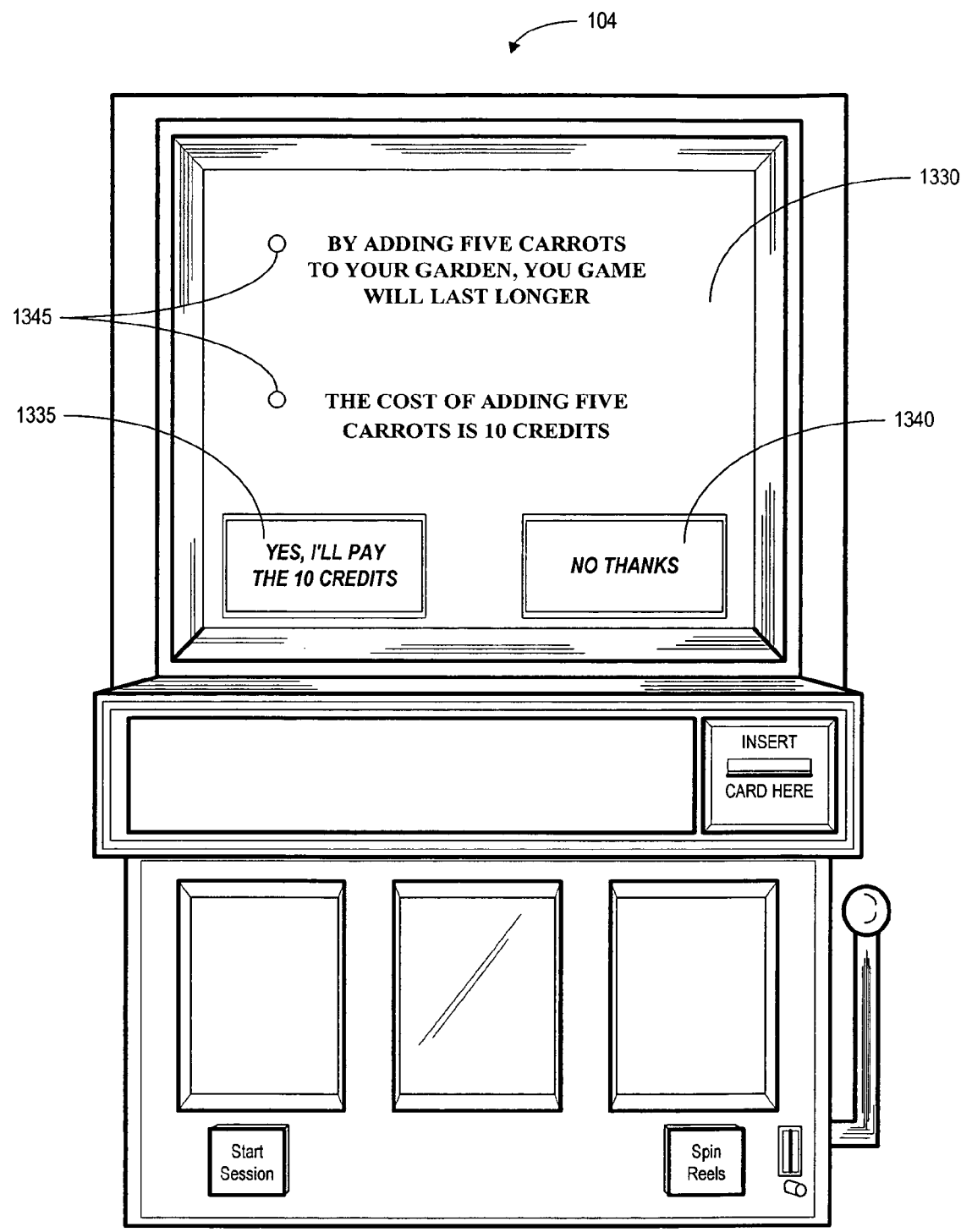

FIG. 13C shows a confirmation screen 1330 that displays confirmation information including promotional information 1345. The promotional information 1345 includes an offer to the player to pay ten additional credits in order to increase the player's number of "Carrot" symbols, and also includes a brief indication of why the additional symbols will be beneficial to the player. As in the confirmation 1300, the confirmation screen 1330 also includes two buttons. Button 1335 may be used by the player to accept the offer ("YES, I'LL PAY THE 10 CREDITS"). In this way, the player can confirm that he would like to play using the additional five symbols, and agrees to pay the required additional ten credits. Alternatively, the player could use the button 1340 labeled "NO THANKS" in order to indicate that he does not accept the offer.

Figure 13D:
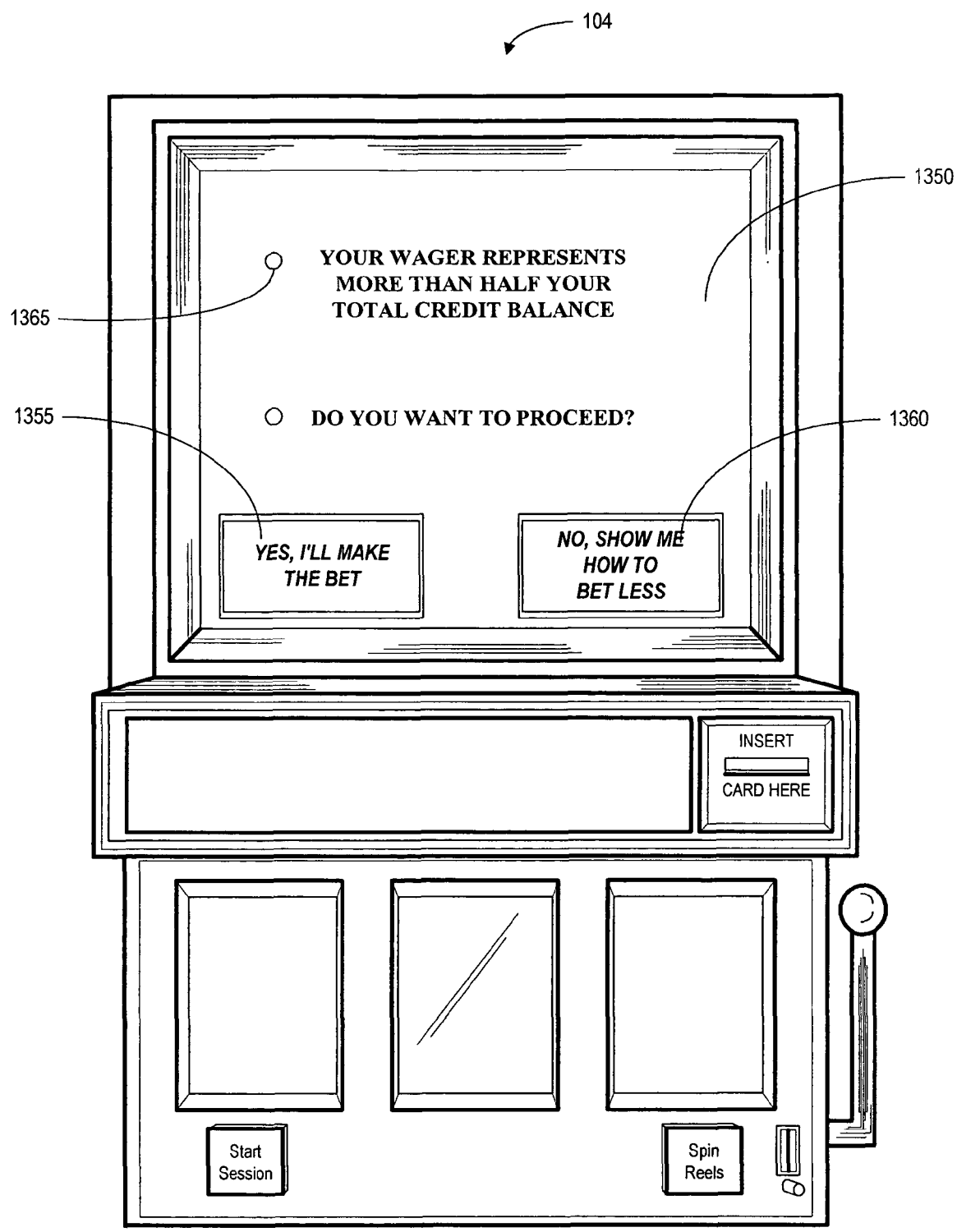

FIG. 13D shows a confirmation screen 1350 that displays confirmation information including cost information 1365. The cost information 1365 includes an indication of the size of a wager in comparison to the user's total credit balance. In this example, the confirmation screen 1350 indicates that the wager is more than half of the total credit balance. Such a message could be output based on a rule or trigger condition (e.g., stored in confirmation criteria database 420) specifying that a player must confirm the wager if it is more than half of his credit balance, for example. In this way, the player may be given an opportunity to back out of a wager before fully committing to it. For instance, the player may not have fully appreciated the size of the wager, the amount of his remaining balance, or both. Button 1355 may be used by the player to respond affirmatively and make the wager. Alternatively, the player could use the displayed button 1360 to indicate that he does not wish to proceed with the wager. In this example, button 1360 may be used to indicate that the player would like to receive additional information about how to make a smaller wager.

Figure 13E:
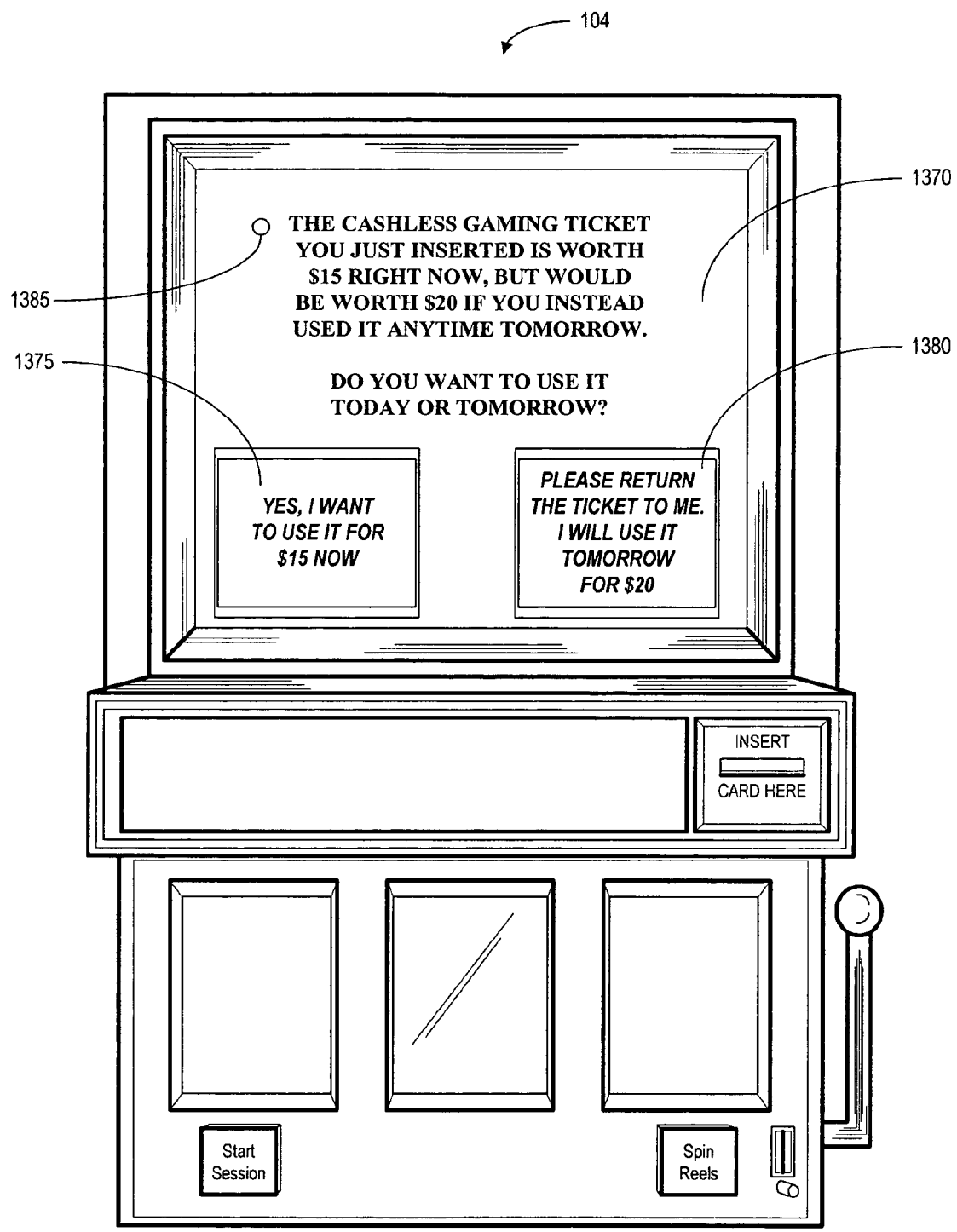

FIG. 13E shows a confirmation screen 1370 that displays confirmation information 1385. The confirmation information 1385 includes information about the current and future wager values of the player's cashless gaming ticket. For example, the confirmation screen 1370 might have been triggered by the player inserting a cashless gaming ticket into a cashless gaming ticket reader of the gaming device 104. According to the confirmation information 1385, the player is being asked to confirm whether he wishes to use the cashless gaming ticket today (when it is worth $15 in value for wagering), or if he would prefer to use the ticket tomorrow instead (when it will be worth $20). In this way, the player may be asked to confirm whether he wants to use his cashless gaming ticket for wagering at the present time. The confirmation information 1385 may also be described as containing an offer to the player to put off use of the cashless gaming ticket until tomorrow, in exchange for an increase in the value of the ticket. Some types of players may find such an option appealing. Exemplary button 1375 may be used by the player to indicate that the player wants to use the ticket today, and the button 1380 is associated with a signal from the player that he does not wish to use the ticket today. If the button 1380 is pressed, the ticket might be returned to the player.

The preceding exemplary confirmation screens 1300, 1325, 1330, 1350, 1370 illustrate only some embodiments and features of the present invention, and should not be construed as limiting the scope of the invention in any way. For example, the text of the represented buttons is merely exemplary, and many other types of descriptive labels could be used to indicate to the player his options for responding to a confirmation message. Various other embodiments and examples of embodiments are discussed in further detail herein, and others will be apparent to those skilled in the art in light of the present disclosure.

3.5. Player Database

FIG. 9 depicts a tabular representation of an example of a player database 418 according to some embodiments of the present. This particular tabular representation of a player database 418 includes sample records or entries which each include information regarding a particular player. In some embodiments of the invention, a player database 418 is used to track information about players including identity, contact information, preferences, performance history, comp points, current activity, and demographics. Those skilled in the art will recognize that such a player database 418 may include any number of entries or additional fields.

The particular tabular representation of a player database 418 depicted in FIG. 9 defines fields for each record or entry. The fields include: (i) a player identifier 900 that may store a representation uniquely identifying the player (e.g., as may also be indicated on a player tracking card); (ii) a name 902 that may store a representation of the player's name; (iii) contact information 904 that may store information about how the corresponding player may be contacted; (iv) a gaming history 906 that may store information about gaming activity of the player (e.g., a number of games the player has played in a current gaming session); (v) an experience level 908 that may include an indication of how experienced the player is (e.g., as a rating or rank); and (vi) a language preference 910 that may include an indication of in what language(s) a player prefers to receive confirmation messages.

Various types of contact or address information may be received and stored about a player (e.g., when a player applies for a player tracking card, when a player checks into a hotel), including a street address, an e-mail address, a telephone number, and/or a local address (e.g., a hotel).

Gaming history 906 may be based on any gaming activity of the player. For example, the insertion of the player's player tracking card may define the start of a session. The system may then track the number of games the payer has played in a current gaming session and store this information in a corresponding record of the player database 418. Historical information related to play of the player with respect to any number of different games, gaming machines, and/or types of games (e.g., prepaid, multi-coin, multi-line) may be stored and tracked, as will be readily appreciated by those of skill in the art.

The experience level 908 may be represented as a number (e.g., in a range from 1 to 10) or a status (e.g., "gold") that is based on, for example, the number of visits the player had made to the casino, the number of total hours of slot play by the player to date, or some other relative measure of how much a player has played.

The example player database 418 depicted in FIG. 9 provides example data to illustrate the meaning of the information stored in this database embodiment. A player identifier 900 (e.g., "PLAYER-1-02834555") may be used to identify and index players listed in the player database 418. In this example, "PLAYER-1-02834555" identifies a player named "Anne Red" as indicated by the player name field 902. According to the database, "Anne Red" has indicated an address of "223 MAIN ST., SPRINGFIELD." The gaming history 906 indicates that "Anne Red" has played "3" games during her current gaming session, and has an experience level 908 of "7." "ENGLISH" is the preferred language 910 for confirmation information.

Of course, various other types of information may be stored and tracked in a player database. For example, in some embodiments a player may indicate a preference relating to output of confirmation information (e.g., a preference for when messages should be suppressed and/or presented, a preference for how messages are represented). In one or more embodiments, a player could be offered the opportunity to customize confirmation information while registering at a slot club booth, a hotel check-in, or other service location. The player might indicate to casino personnel, for example, that his preferred language is German, that he wants to see confirmation screens only when the total cost of the game is seventy-five credits or more, and that he wants to be notified at least thirty minutes in advance of any pending restaurant reservation that he had made.

A gaming device 104 may utilize information in the player database 418 when determining, for example, whether to provide confirmation information to a player, how to provide confirmation information, and/or what type of confirmation information to show.

3.6. Confirmation Criteria Database

FIG. 10 depicts a tabular representation of an example of a confirmation criteria database 420 according to some embodiments of the present invention. This particular tabular representation of a player database 420 includes sample records or entries which each include information about criteria that may be used for determining whether to output confirmation information to a player. A confirmation criteria database may be stored in the data storage device of the gaming device in tabular form, or any other appropriate database form, as is well known in the art. The data stored therein may include a number of records or entries, each defining a particular criteria that must be satisfied before confirmation information is displayed to the player. Those skilled in the art will understand that the confirmation criteria database may include any number of entries. The tabular representation also defines fields for each of the entries or records. The fields specify: (i) a criteria identifier 1000 that uniquely identifies at least one criterion; and (ii) a criteria description 1002 that includes a representation of the criteria.

As discussed herein, a confirmation criteria database may be utilized in the performance of some of the inventive processes described herein. In some embodiments, the gaming device 104 and/or controller 102 may utilize the confirmation criteria database 420 prior to the initiation of each game at the gaming device 104. For example, the gaming device 104 may calculate a cost for a prepaid session and transmit the required cost and a player identifier to a slot server 102. The slot server 102 then determines, based on the received information and criteria in the confirmation criteria database 420, whether to output a confirmation message. Additionally, or alternatively, in some embodiments the criteria may be used in determining what confirmation information (if any) to output to a player.

In some embodiments, confirmation criteria may be associated (e.g., using an additional record field) with one or more particular games or types of games. The type of game may be the subject of a criterion. In one or more embodiments of the invention, a confirmation criteria database 420 is used to store, manage, and track information about criteria.

4. PROCESSES

The exemplary system discussed above, including the hardware components, software components, and the databases, are useful to perform various methods of the invention. However, it should be understood that not all of the above-described components and databases are necessary to perform any of the methods of the present invention. In fact, in some embodiments, none of the above-described system is required to practice the methods of the present invention. The system described above is merely an example of a system that would be useful in practicing the invention's methods.

For example, the confirmation information database 324 described above with respect to FIG. 8 is useful for storing confirmation information, but it is not absolutely necessary to have such a database in order to perform the methods of the invention. For example, the methods described herein may be practiced using a game device program that is able to create information for confirmation screens without having to access a database.

4.1. Exemplary Trigger Condition Process

Figure 11:
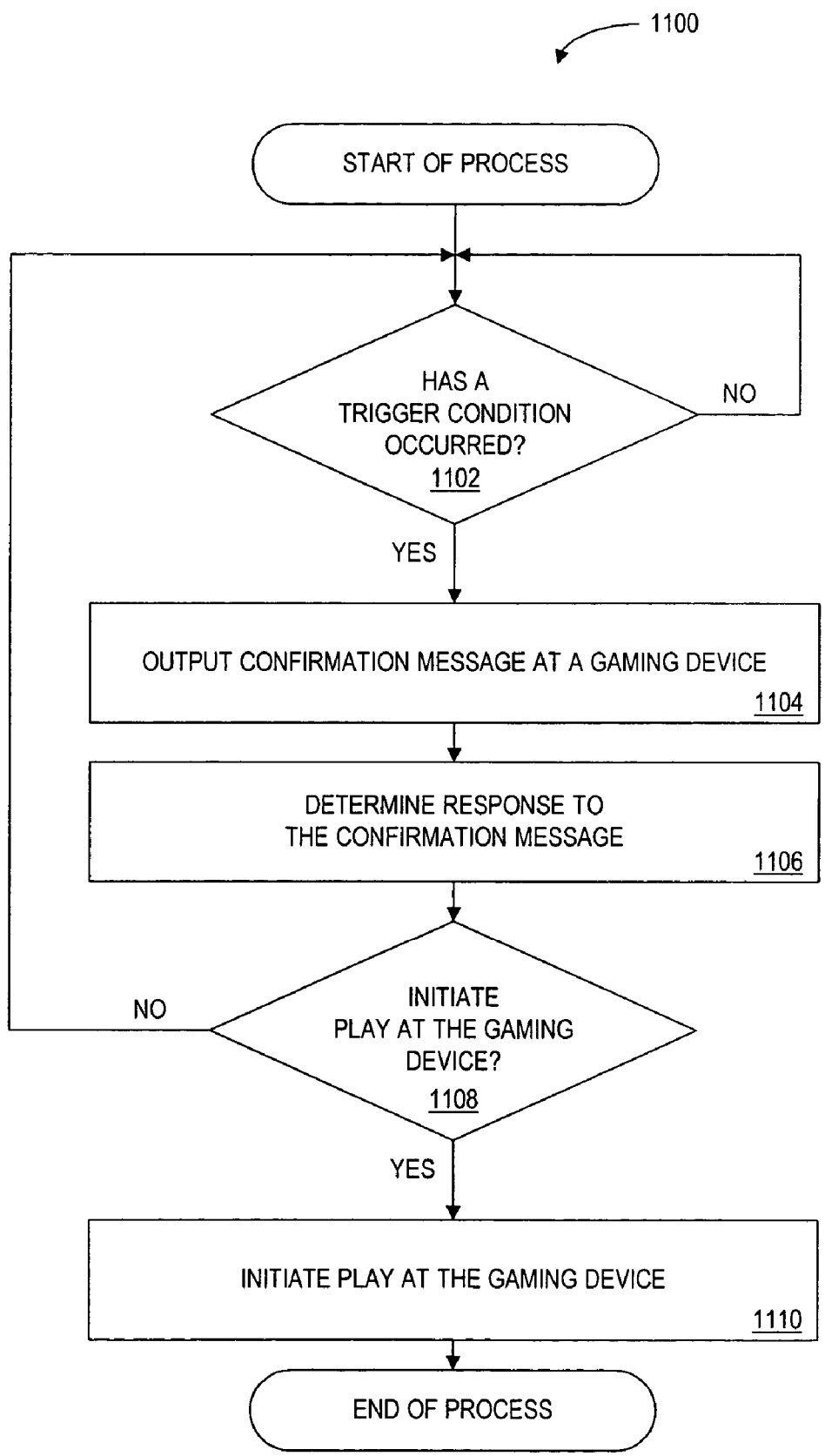
FIG. 11 is a flow chart illustrating an example process according to some embodiments of the present invention.

Referring to FIG. 11, a flow chart 1100 is depicted that represents some embodiments of the present invention that may be performed by a controller 102, a gaming device 104, a peripheral device 210, a peripheral device server 216, and/or a casino. It must be understood that the particular arrangement of elements in the flow chart 1100 of FIG. 11, as well as the number and order of example steps of various methods discussed herein, is not meant to imply a fixed order, sequence, quantity, and/or timing to the steps. Embodiments of the present invention can be practiced in any order, sequence, and/or timing that is practicable. Likewise, the labels used to reference the individual steps of the methods are not meant to imply a fixed order, sequence, quantity, and/or timing to the steps.

In general terms and still referring to FIG. 11, method steps of some embodiments of the present invention may be summarized as follows. In step 1102, the system waits for a trigger condition to occur. In step 1104, a confirmation message is output at a gaming device. In step 1106, a response to the confirmation message is determined. In step 1108, the system determines whether to initiate play at the gaming device. In step 1110, play at the gaming device is initiated. As indicated above, in some embodiments these steps may be performed in a different order, and more, fewer, and/or alternative steps may be used as well.

In the discussion that follows, each of these exemplary steps will be discussed in greater detail. Note that not all of these steps are required to perform the methods of the present invention and that additional and/or alternative steps are also discussed below. Also note that the above general steps represent features of only some of the embodiments of the present invention. Such steps may be combined and/or subdivided in any number of different ways so that methods of the present invention include more or fewer actual steps. For example, in some embodiments additional steps may be added to update and maintain the databases described above. As indicated, however, it is not necessary to use the above-described databases in all embodiments of the invention. In some embodiments, a described step may be performed by or with respect to any number of devices or entities. For example, a step may be subdivided into sub-steps, some of which are performed by one device, and some of which are performed by or otherwise involve a different device. In other words, the methods of the present invention may contain any number of steps performed by any number of entities that are practicable to implement the various different inventive processes described herein.

4.1.1. Awaiting a Trigger Condition

In step 1102, the system waits for a trigger condition to occur. The trigger condition (e.g., a confirmation trigger) may be associated, for example, with a confirmation message. Thus, one way to control the output of confirmation information is to output a confirmation message based on a trigger condition. A trigger condition may be a condition that causes a message to be output at a game machine.

In some embodiments, a message may be output to a player based on a trigger condition. For example, a message may be output to a player when a trigger condition occurs, thereby ensuring that the message is output at an appropriate time (e.g., when the player would be interested in viewing the message). Messages may be output based on a variety of different factors, including a player's gaming activities (e.g., what games are played and when), a player's other activities (e.g., inserting a player tracking card at a slot machine), preferences (e.g., no messages after the first half hour of gaming at a game machine), and other messages (e.g., similar messages, or messages that have been output recently).

Note that trigger conditions may be useful in enabling a variety of different functions, including:
  (i) determining when to output a message
  (ii) determining an appropriate time to output a message
  (iii) determining what message to output (e.g., what confirmation information should be included)
  (iv) determining how to output a message. For example, a trigger condition may be used to determine a representation of a message.
  (v) delaying output of a message until a trigger condition occurs. For example, it may be annoying to output a confirmation message to a player while he is in the middle of a winning streak or busy configuring features on a game machine. Therefore, outputting a confirmation message to a player may be delayed until an appropriate time.

Confirmation information could be displayed to the player based on one of the following triggering events:
  (i) At the beginning of each game
  (ii) When the player inserts his player tracking card
  (iii) When the player inserts a bill into the bill validator
  (iv) When the credit balance of the player reaches a predetermined level
  (v) When the player makes a wager
  (vi) When the player selects a number of paylines to play
  (vii) When the player selects a wager to make per payline
  (viii) When the player chooses an action in a bonus round A trigger condition may be based on one or more factors. Some general categories of factors include:
  (i) activities by a player (including a player's gaming activities and non-gaming activities)
  (ii) characteristics of a player
  (iii) indications provided by the player
  (iv) indications provided by other parties (e.g., a casino rep, a friend of a player)
  (v) time-related factors
  (vi) characteristics of a game machine or game In some embodiments, the controller 102 and/or gaming device 104 may store a trigger condition database that stores information about trigger conditions and one or more types of information to output if the trigger condition is true. For example, the information associated with "INFO-1-642985152" may be output if a trigger condition is satisfied by a player inserting his player tracking card into a player tracking card reader of a slot machine. Note that a given set of trigger conditions may be active only certain times, for certain players, and/or for certain confirmation content.

According to some embodiments, a confirmation message may be output based on factors relating to a player's gaming activities. For example, a message may be output to a player if a game parameter value has changed.

Examples of factors relating to a player's gaming activities include:
  (i) an amount of play
  (ii) a rate of play
  (iii) a credit balance
  (iv) events at a game machine that is operated by a player
  (v) statistics relating to usage of a game machine by a player
  (vi) characteristics of a game machine Examples of factors relating to an amount of play include:
  (i) a duration of play (e.g., how many minutes a player has operated a game machine)
  (ii) how many games a player has played
  (iii) how many comp points a player has earned
  (iv) how long a player uses a feature on the game machine (e.g., how long a player operates a game machine in 3D Graphics Mode)
  (v) how long a condition has been true (e.g., How long has the player maintained a rate of play of more than 7 games per minute? For how many games has the player's credit balance been above 40 coins?)
  (vi) how many spins in a row have been winners Note that an amount of play may be measured in a variety of different units, including:
  (i) time (e.g., seconds, minutes, hours)
  (ii) occurrences (e.g., number of spins, number of games)
  (iii) currency (e.g., number of coins, dollar value, comp points)

Examples of factors relating to a player's rate of play include:
  (i) amount of currency per minute (e.g., coins per minute, dollars per minute)
  (ii) average amount of currency per minute (e.g., on a game machine that he is currently operating, on all game machines that he has played since acquiring a player device)
  (iii) average amount of currency per spin
  (iv) average number of games per minute
  (v) whether a player is currently operating a game machine (i.e., is his rate of play greater than zero?)
  (vi) reel resolution time as set by the casino or in some embodiments, by the player Examples of factors relating to a player's credit balance include:
  (i) current credit balance on a game machine
  (ii) a current credit balance on a plurality of game machines (e.g., in an embodiment in which a player may operate a plurality of game machines simultaneously, or store a credit balance on a game machine)
  (iii) average credit balance (e.g., on a game machine that he is currently operating, on all game machines that he has played since acquiring a player device)

Examples of factors relating to events at one or more game machines include:
  (i) outcomes that are generated by a game machine
  (ii) payouts that are provided by a game machine (e.g., 10 coin payout, a $100 jackpot)
  (iii) money is inserted into a game machine by a player (e.g., using a bill acceptor or a coin slot)
  (iv) money is removed from a game machine by a player (e.g., a player presses the 'cash out' button)

(v) a player identifies himself (e.g., a player may insert a player tracking card into the game machine)

(vi) a feature is activated or deactivated. According to some embodiments, a player may receive a confirmation message when the player chooses to enable a particular feature.

(vii) a player operates an input device on a game machine (e.g., a player presses the 'spin' button on a slot machine; a player uses a touch screen to select a card on a video poker machine)

(viii) indications from sensors—For example, a game machine may have a weight sensor that determines when a player is standing in front of the game machine. In a second example, a game machine may have a microphone that may be used to determine when a player is speaking (e.g., with a friend).

(ix) navigation of menus on a game machine. For example, a player may use one or more menus on a game machine to select a feature or indicate his preferences.

In addition to events themselves, information about events may be factors that affect a trigger condition. Examples of information about events include:

(i) what event occurred (ii) when the event occurred (e.g., what date, what time of day, ordering of events)

(iii) how often an event occurred (e.g., 14 times, an average of 32.6 times per hour)

(iv) how much money was added/removed/involved in the event (e.g., How much money did a player insert into a game machine? How large was a payout provided to a player?)

(v) results of the event (e.g., What was a player's credit balance after he won a jackpot? What is the state of a program on a game machine after the game machine's software is upgraded?)

(vi) what caused an event to occur (e.g., why did a player win a jackpot of 100 coins?)

(vii) other information describing the event (e.g., what authentication code was provided, what activation code was provided)

Examples of characteristics of a game machine include:

(i) output devices of the game machine (e.g., is an output device currently in use and therefore not available to output a message)

(ii) input devices of the game machine (e.g., is an input device currently in use and therefore not available for a player to use to respond to a message)

(iii) hardware of the game machine (e.g., does the game machine have enough memory or the correct type of device to display a message?)

Examples of characteristics of players include:

(i) a player's preferences (e.g., a player may indicate his preferences for receiving confirmation messages)

(ii) what language a player speaks (iii) information stored in a player database (e.g., player database 418)

(iv) information determined by a casino representative (e.g., by talking to the player)

(v) the player's hobbies and interests (e.g., sailing, golf)

(vi) psychological characteristics of the player (e.g., creativity, risk-aversion)

Indications by various parties may be factors in outputting a confirmation message. Examples include:

(i) A player may provide an indication. For example, a player may press a button on a game machine to indicate that he would like to play a game.

(ii) A casino employee may provide an indication. For example, a casino employee reviews information about a player that is stored in a database (e.g., the player database shown in FIG. 4). Based on this review, the casino employee may indicate that a player seems confused and should receive assistance in learning how to play a game.

(iii) An associate of a player (e.g., a friend or relative) may provide an indication.

A confirmation message may be output based on a player's gaming activities. Alternatively, or in addition, a message may be output to a player based on gaming activities at a casino that are not necessarily performed by the player. For example, a message may be output to a player based on the average utilization of a game machine over the last month. Examples of factors relating to gaming activities at a casino include:

(i) overall usage of a game machine that a player is operating (i.e., including usage by other players). See below for examples of factors relating to usage of at least one game machine.

(ii) usage of other game machines at a casino (e.g., nearby game machines, game machines of the same type, game machines that share a progressive jackpot, game machines with a common theme, game machines that are associated with a game machine operated by the player). See below for examples of factors relating to usage of at least one game machine.

(iii) gaming activities at a casino that do not involve game machines (e.g., table games, betting on horse races and other sporting events)

Examples of factors relating to usage of one or more game machines include:

(i) whether a game machine is currently in use. For example, an unoccupied game machine may output a message to a nearby player (e.g., a player who is walking by the game machine).

(ii) when a game machine was last used (e.g., a player just stopped using a game machine)

(iii) overall utilization of one or more game machine (e.g., measured as what percentage of time a game machine is in use).

(iv) events at one or more game machines. For example, a message may be output to a player if the game machine determined that one or more game parameters should be changed.

(v) statistics relating to usage of one or more game machines. For example, a message may be output to a player if the player's average rate of play is higher than a threshold amount (e.g., in order to give the player a chance to confirm the rules of the game).

According to some embodiments of the present invention, output of confirmation messages may be prevented or suppressed. For example, the controller 102 or a game device 104 may prevent a message from being output to a player if the message would be distracting to the player or would be unnecessary (e.g., if the player is an experienced player, if the player has indicated he does not want to receive any messages). Suppression of confirmation screen may be appropriate when, for example, a player has played a game at least twice, the player is considered an expert, or the player has requested not to receive any confirmation messages.

Suppressing a message may include:

(i) preventing the message from being output (ii) not outputting the message (iii) canceling output of the message (iv) delaying output of the message (v) outputting a message through a different device Benefits of suppressing a confirmation message may include:
  (i) Players may no longer be annoyed or bothered by inappropriate messages.
  (ii) Players may not be distracted from their gaming as often.
  (iii) Since inappropriate messages may be suppressed, players may pay closer attention to those messages that are output.

One way to control the suppression of confirmation messages is to suppress a message based on a suppression condition. Note that a suppression condition may be thought of as the opposite of a trigger condition. For example, a message may be output when a trigger condition is true, and a message may not be output when a suppression condition is true.

A suppression condition may be based on one or more factors. General categories of factors that may cause a message to be suppressed include the same factors listed for trigger conditions discussed in detail above. A message may be suppressed based on any of the factors listed for trigger conditions. For example, a message may be suppressed based on various confirmation criteria, as discussed herein. In some embodiments, suppressing a message may comprise determining that one or more confirmation criteria are not satisfied (e.g., a message is suppressed if the player experience level is not less than "8"). Of course, suppressing a message may comprise determining that one or more criteria are satisfied (e.g., a message is suppressed if a cost of a game is less than fifty credits). In one example, output of confirmation information may be suppressed for a player who has indicated he does not want to receive any messages. In another example, based on information about a player in the player database 418 (e.g., the player's experience level), information related to play of the game may always be suppressed (but information about the cost of the game may still be presented in a confirmation message).

Suppressing a message may include delaying output of the message. Output of a message may then be delayed until a trigger condition occurs. Suppressing a message may include canceling or deleting the message. That is, confirmation information may be completely removed from a confirmation information database 324. Optionally, a controller 102 or gaming device 104 may store a suppression condition database.

Additional examples of trigger conditions, suppression conditions, factors related to conditions, storage, management, and tracking of conditions, as well as appropriate ways in which such types of conditions may be used in practicing methods of the present invention, are described in U.S. patent application Ser. No. 10/685,143 (incorporated by reference). Other various types of conditions, factors, and their uses may be apparent to those having skill in the art in light of the present disclosure.

According to some embodiments of the present invention, the occurrence of a trigger condition includes receipt of a game initiation signal. For example, a slot machine receives a game initiation signal from a player. In one embodiment, the game initiation signal is a signal generated when the player presses a "start game" button or a "play game" button of the gaming device. The button might be, for example, a physical button depressed by the player, or an area of a touch-sensitive screen (e.g., an "OK" button of a pop-up dialog box).

In some embodiments, a game initiation signal may be received, for example, after the player has selected a number of paylines to play, selected a number of coins to wager per selected payline, or indicated a selection of any of various types of game parameter values (e.g., a number of carrot game symbols to start with in a game).

In some embodiments, the receipt of the game initiation signal may be sufficient to trigger output of a confirmation message. In other embodiments, the receipt of a game initiation signal may be necessary but not sufficient for a trigger condition. For example, as discussed below, confirmation criteria may also need to be satisfied. In some embodiments, whether a trigger condition has occurred may be based only on whether one or more confirmation criteria (e.g., as stored in the confirmation criteria database 420) have been satisfied.

According to some embodiments, determining whether a trigger condition has occurred includes determining whether confirmation information should be provided based on the satisfaction of criteria related to a particular player and/or the game or gaming device to be played. Other types of factors on which confirmation criteria may be based are discussed above with respect to trigger conditions.

In one exemplary embodiment, the slot machine retrieves information stored within the confirmation criteria database 420. As discussed herein, a confirmation criteria database 420 could be stored at a slot server and/or stored locally within the memory of the slot machine.

According to one embodiment, if all of the criteria stored in the database are satisfied, then confirmation information may be presented to the player. If, however, one or more of the criteria are not satisfied, then confirmation information is not presented to the player. For example, in order to determine whether all three exemplary criteria depicted in confirmation criteria database 420 were met in order for the confirmation information to be displayed, the slot machine would retrieve (or otherwise determine) values corresponding to the cost of the game, the player experience level, and the number of games played by the player in this session. The values would then be compared to the exemplary stored criteria limits to see if the criteria had been satisfied.

The following example refers to exemplary criteria information depicted in the tabular representation of the confirmation criteria database 420 (FIG. 10). According to the example, a player requests a prepaid game costing ten credits per payline activated, with six paylines activated. The slot machine determines the number of credits required by the player for the prepaid session would be a prepaid cost of sixty credits. Because the cost of sixty credits is greater than or equal to fifty credits, the criterion "CRIT-1" would be satisfied. The slot machine also accesses the player database 418 stored at the slot server and retrieves the value stored in the experience level field 908 of the record associated with the player's tracking number (e.g., from a player tracking card inserted by the player). For example, the record of the player database 418 corresponding to the player might indicate an experience rating of "2," indicating relatively little gaming experience (with a possible maximum of "10"). Since this experience ranking is less than or equal to "7," the criterion "CRIT-2" is satisfied. Finally, the slot machine determines that no games have been played so far in this gaming session as the player has just sat down at the machine. Since the number of games played is less than or equal to three, the "CRIT-3" criterion is met. In this example, since all three of the confirmation criteria had been met, the slot machine determines that confirmation information should be shown to the player. Thus, the occurrence of a trigger condition for outputting a confirmation message may be based on one or more confirmation criteria.

In the previous example, all of the confirmation criteria needed to be met. In other embodiments of the present invention, only one or more of the confirmation criteria need be satisfied in order to trigger output of a confirmation message to the player. Also, some types of confirmation criteria may be applicable to some games and not to others. Of course, more or fewer than three criteria could be checked, and the determination that confirmation information should be shown to the player might require only a majority of the criteria to be met, or all but one of the criteria.

In some embodiments, instead of a binary indication (e.g., "TRUE" or "FALSE") of whether or not a criterion had been met, each criterion could be associated with a respective number of points if the criterion is satisfied. The total number of points tallied for any satisfied criteria could then be used to determine whether or not to show confirmation information to the player. For example, a confirmation message might be appropriate only if the total number of points exceeded a predetermined threshold. Thus, different criteria may be given different values, influence or weight in determining whether to output confirmation information at a gaming device.

According to some embodiments, in addition to or in lieu of determining whether to output any information at all, confirmation criteria may be used to determine what confirmation information (or type of confirmation information) to output to a player. For example, if a player's experience level exceeds a predetermined experience level, it may indicate that the player does not need to see any information about how a game is played. It may still be appropriate, however, to display cost information in a confirmation request based on the calculated cost that must be prepaid by the player. For example, the player's confirmation screen would then indicate the cost the player is about to incur and request the player's approval, but would not bother the player with any unnecessary instructive information. Also, portions of the confirmation information may be shown to the player based on a point score-based criteria system, as discussed above.

According to some embodiments, confirmation criteria may be satisfied (and thus a trigger condition may have occurred) when a player is new or relatively inexperienced. A player may be considered inexperienced if, for example, the player has recently registered with a casino (e.g., has just received a player tracking card), is using a player tracking card for the first time, is using a type of slot machine or playing a particular game (or type of game) for the first time. As described herein, an indication of the player's experience level may be stored and tracked in a player database.

According to the exemplary process 1100, if in step 1102 the system determines that a trigger condition has occurred, the process proceeds to step 1104. Otherwise, the system continues to await the occurrence of a trigger condition.

4.1.2. Outputting a Confirmation Message

In step 1104, the confirmation message is output at a gaming device. The gaming device may be operated by a player, who may or may not be identified. For example, a player may or may not have inserted a player tracking card into the gaming device. Variations of outputting a message at a gaming device may include:

(i) outputting an indication of a message
(ii) outputting a representation of a message
(iii) displaying a message
(iv) revealing a message
(v) indicating a message
(vi) outputting a message through a gaming device
(vii) outputting a message on a gaming device
(viii) outputting a message using a gaming device
(ix) outputting a message using an output device at a gaming device
(x) outputting a message by transmitting it to a gaming device
(xi) a gaming device outputs a message
(xii) outputting a message using a device associated with a gaming device (e.g., a player tracking card reader)
(xiii) outputting a message using a device associated with a plurality of gaming devices (e.g., a central display for progressive jackpot)

A player may customize how messages are output to him, when messages are output to him, or what type of messages are output to him. For example, a player may indicate that he prefers to receive confirmation messages when he presses the "Spin" button on a gaming device. In order to customize how messages are output to him, a player may indicate his preferences. Various ways that a player may indicate his preferences and thereby customize how messages are output to him are now described.

One way for a player to indicate a preference is by indicating a rule or condition for outputting one or more messages. A rule may be a trigger condition, a suppression condition, or an indication that is convertible to a trigger condition or suppression condition (e.g., a text phrase or a selection from a list of options).

A player may indicate a preference for at least one specific type of message. Examples include:
(i) A player may indicate that he only wants to receive confirmation messages at the beginning of his gaming sessions.
(ii) A player may indicate that he that he would like confirmation messages to be output to him in audio format.
(iii) A player may indicate that instructive information should not be output to him after he has been playing a gaming device for more than ten minutes.
(iv) A player may request that she receive instructions any time she starts playing a game that she has never played before.

A player may indicate a preference for all messages. Examples include:
(i) A player may indicate that no messages of any type should be output to him while he is playing a bonus round.
(ii) "All messages should be output in pop-up windows."

A player may indicate a preference of when to output one or more messages. Examples include:
(i) "Output confirmation messages at the beginning of a gaming session when I insert my player tracking card."
(ii) "Output an instructive message the first time I win access to a bonus round on a gaming device."
(iii) "Instructive messages should be output in between game plays (i.e., after the end of a game play and before the beginning of the next game play)."
(iv) A player may indicate that he would like to receive messages at the present time (e.g., "Now is a good time to output messages.")

A player may indicate a preference of when to not output one or more confirmation messages. In some cases, rules for when messages should not be output may be more common than rules for when messages should be output. Examples include:
(i) "Don't output a message in the middle of a winning streak."
(ii) A player may indicate, "It's okay to output messages anytime except when I'm in the middle of composing an instant message."

(iii) A player may operate an input device on a gaming device to indicate that he would not like to receive any promotional information until after he has won a payout of at least ten coins on a gaming device.

(iv) A player may indicate that he does not want to receive any messages at the present time (e.g., "Don't output any messages for the next 5 minutes." or "Postpone any messages for 5 minutes.") This feature may be particularly useful if a player is in the middle of a winning streak on a gaming device, is busy conversing with a friend, or otherwise would not be able to devote his full attention to a message that is output.

A player may indicate a preference of how to output one or more confirmation messages. Examples include:

(i) "Confirmation messages should be output in audio format."

(ii) "Instructive information should be output in green text in the header window on my gaming device."

(iii) "Pop-up windows that display confirmation messages should close automatically in ten seconds."

A player may indicate a preference of how not to output one or more messages. Examples include:

(i) "If a gaming device that I'm operating has a music soundtrack, don't output messages in audio format."

(ii) "If a message is longer than 50 words, don't output it using the footer partition. Output it in a pop-up window."

An indication of a player's preference relating to at least one message may be stored in a database, such as the player database 306 shown in FIG. 4. For example, the player database may store an indication that a player prefers to receive instructive information at the start of his gaming session, but not during the middle of his gaming session.

A player may indicate his preferences using an input device on a gaming device. The game device may in turn transmit an indication to the controller. Examples include:

(i) A player may use a touch screen on a gaming device to navigate one or more menus and select what types of messages he would like to receive and when he would like to receive these messages.

(ii) A player may press a button on a slot machine marked "Give me an offer."

(iii) A player may use a touch screen on a slot machine to indicate that he would like help in understanding how to play a game.

(iv) A player may pick up a telephone on the side of a gaming device, thereby identifying himself and initiating a telephone call to check the phone messages in his hotel room.

A player may indicate his preferences using a computer terminal. Note that computer terminals may take various forms, including: a personal computer, a set-top box, a kiosk, a notebook computer, a tablet computer, a personal digital assistant (PDA), a cellular telephone.

A player may indicate his preferences by filling out a form. For example, a player may fill out a registration form at a casino's front desk. These preferences may then be entered into a computer system (e.g., the controller 102), so that messages may be output to the player based on the preferences. A player may indicate one or more preferences by selecting a preference from a multiple-choice menu. For example, a gaming device or computer terminal may display a list of preferences on a touch screen. To indicate his preferences, a player may select preferences from the list using the touch screen.

An indication of a player's preference may be stored, for example, in a player database 418. Alternatively, a player may not be able to customize the output of confirmation messages.

Outputting a confirmation message may include outputting a representation of confirmation information. Outputting a confirmation message may also comprise determining a representation of the confirmation information (e.g., a formatting of the confirmation information). A particular representation may be determined from among a variety of different representations and may be based upon many different factors. In other words, any given confirmation message may be output in a variety of different ways. For example, confirmation information may be output in English or in Spanish, in text or in audio, or in green or in blue. The term "representation" is used to refer to a method of outputting confirmation information and may refer to a particular confirmation message. Confirmation information may have one or more possible representations. For example, the same confirmation information may be communicated in any of four available representations:

(i) a text representation in English (ii) a text representation in Spanish (iii) an audio representation in English (iv) an audio representation in Spanish According to some embodiments, a plurality of representations of confirmation information may be output. Examples include:

(i) For example, a text confirmation message, "You get a free spin each time you insert a $10 bill" may be displayed in a pop-up window (a first representation), and an audio recording describing the confirmation information may be played (a second representation).

(ii) Confirmation information may include a movie with an audio soundtrack that describes the confirmation information. In addition, a text version of the confirmation information (e.g., closed captioning) may be output along with the movie.

(iii) Confirmation information may be output on a plurality of game machines. For example, a text confirmation message may be output on both of two game machines that are right next to each other. In a second example, a first half of confirmation information may be output on a first game machine and a second half of confirmation information may be output on a second game machine.

Representations of confirmation information may differ from each other in variety of ways, including:

(i) media format (e.g., text, audio, video)

(ii) language (e.g., English, Spanish, French)

(iii) presenter (e.g., a celebrity, a man with a Texas accent)

(iv) partitions (e.g., pop-up windows, sidebars)

(v) visual cues (e.g., color, font, animation)

(vi) categories (e.g., reservation confirmation messages, instructive confirmation messages)

(vii) output devices (e.g., CRT screen, LCD screen, audio speaker, on the video reels of a slot machine, on another are of a gaming device).

Some of these variations of representations are described in detail below.

Different representations of confirmation information may optionally be stored in a database, such as the confirmation information database 324 (FIG. 8). Alternatively, or in addition, different representations of confirmation information may be generated (e.g., as necessary) by a computer system (e.g., the controller 102, or a gaming device 104).

It will be readily understood that a confirmation message may be communicated in a variety of different media formats, including:

(i) text—For example, a text confirmation message may be displayed on a video screen.

(ii) audio—For example, a 'beep' sound may be output anytime confirmation information is displayed on a video screen. In a second example, a recorded voice may describe confirmation information to a player. According to some embodiments, confirmation information may be output in audio form only and may not have a video component.

(iii) video—For example, a sequence of images (e.g., a movie) may be displayed to a player using a video screen. For instance, a demo of a game play may be output to a player.

(iv) binary—For example, an LED on a slot machine may act as a warning light-lighting up to indicate confirmation information to a player and turning off to indicate no confirmation message.

(v) icons—Confirmation messages may be represented by pictures. For example, a status confirmation message indicating that a player's table reservation is ready may be represented by a picture of a plate of food.

Confirmation information may be presented in a plurality of ways. For example, a confirmation message may include both a text component and an audio component.

Confirmation information may have a plurality of representations in different languages. For example, confirmation information may have a first representation in English and a second representation in Spanish. In a second example, confirmation information may have a text representation in English, a text representation in Chinese, an audio representation in English, and an audio representation in Chinese. Representing confirmation information in multiple languages may be particularly helpful for foreign players who are visiting a casino. Examples of languages for a representation of confirmation information include:

(i) spoken languages (e.g., English, Spanish, French, German, Chinese, Arabic, Hindi)
(ii) written languages (e.g., Braille, Latin)
(iii) computer languages (e.g., HTML, XML, binary)

It may be particularly useful to have representations of confirmation information for users with a disability. Examples include:

(i) for the vision-impaired—For example, confirmation information may be output in Braille or large font text.
(ii) for the hearing-impaired—For example, a video confirmation message may have closed-captioning text, or confirmation information may be transmitted to a player's hearing aid using a Bluetooth radio channel. In a second example, confirmation information may include a video of a presenter describing confirmation information in sign language.

Confirmation messages may have a presenter (e.g., a character that presents the confirmation information to a player). Examples of presenters include:

(i) a person speaking in an audio confirmation message
(ii) a synthesized voice in an audio confirmation message
(iii) a person in a video confirmation message
(iv) a plurality of speakers in an audio confirmation message
(v) an animated character in a video confirmation message—For example, an avatar, virtual assistant or other on-screen character may be displayed to a player in conjunction with confirmation information. For example, an animated rabbit may be displayed on video screen and "talk" to a player, thereby outputting one or more confirmation messages. Indications from the rabbit may be provided as text (e.g., displayed using a speech bubble as a partition), and/or as audio (e.g., an audio recording may be played, allowing the rabbit to "speak" to the player.)

It is anticipated that players may pay more attention to representations of confirmation message that include certain presenters. For example, a player may pay more attention to confirmation information that is presented by his favorite celebrity.

According to some embodiments, a game machine may include multiple video screens or multiple "windows" represented on a single video screen, as will be readily understood by those having ordinary skill in the art. A partition may refer to a video screen, or to an area of a video screen, that is used to display information, including confirmation information. Some common examples of partitions include windows, split-screen displays, sidebars, headers, and footers.

According to some embodiments, confirmation information may be output using a partition. For example:

(i) A game machine may include a video screen, and a partition of the video screen may be used to output confirmation information to a player.
(ii) Confirmation information may be output in a partition on a game machine.
(iii) A partition on a game machine may display confirmation information.
(iv) A partition on a game machine may output confirmation information.

Some examples of partitioning include:

(i) A slot machine may have a single video screen that is split in half. The left side of the screen (i.e., a first partition) may show confirmation messages and the right side of the screen (i.e., a second partition) may show an image of slot machine reels used in playing games on the slot machine.
(ii) A slot machine may have two video screens, each one corresponding to a partition. The first video screen displays slot machine reels and is used to indicate outcomes during games played on the slot machine. The second video screen is used to output confirmation messages to players.
(iii) A game machine may have a single video screen that is split into three partitions: a header, a sidebar, and a main window.
(iv) sidebar—For example, a portion of a video screen along the left or right side of the video screen may be designated as a partition.
(v) header—For example, a portion of a video screen along the top of the video screen may be designated as a partition.
(vi) footer—For example, a portion of a video screen along the bottom of the video screen may be designated as a partition. For example, a footer on a video screen may be reserved to display confirmation messages and alert to a player based on the player's current activities.
(vii) windows—A video screen may be subdivided into one or more movable partitions (a.k.a. "windows") and an immovable partition (a.k.a. "a desktop"). Each window may be a different partition, and it may be possible to have partitions overlap (i.e., a first partition may obscure some or all of a second partition).
(viii) picture-in-picture—A video screen may be divided into two partitions. The first partition may take up most of the video screen, except that a portion of the first partition may be obscured by the second partition, which is overlaid on top of the first partition. The second partition may be significantly smaller than the first partition.

(ix) pop-up-window—A new partition may be created on a video screen and this partition may display confirmation information to a player.

(x) pay table—A game machine may include a pay table (e.g., that describes one or more payouts that may be provided to players based on. Confirmation information may be displayed to a player overlaid on the pay table or on a partition associated with the pay table (e.g., a header or footer).

(xi) progressive meter—A game machine may include an auxiliary display screen like a progressive meter, which may be bolted onto the top of the game machine or built-into the game machine. This auxiliary display may be used to display confirmation information to a player.

A partition may be created to output confirmation information. That is, the following steps may be performed:
(i) creating a partition
(ii) outputting confirmation information in the partition Partitions may be on separate video screens. For example, a slot machine that has two video monitors may have three partitions: two partitions on the first monitor and a third partition on the second monitor. In some embodiments, the displayed content of separate partitions may be controlled by separate devices. For example, a slot machine may have two partitions: a primary game screen and a secondary game screen. The first screen may be controlled by the slot machine, and the second screen may be controlled by the controller or a peripheral device server.

If confirmation information is output in a visual format (e.g., text, images, video), then a representation of the confirmation information may include various visual cues. Examples of visual cues that may vary between representations include:
(i) color—For example, promotional information may be output in red text and instructive information may be output in blue text.
(ii) windows—For example, a first window may show confirmation information relating to features, a second window may show confirmation information related to costs.
(iii) titles—For example, confirmation information may display in a window with a title bar that indicates the topic of the confirmation information.
(iv) fonts—For example, confirmation messages that offer changes to a game parameter may be in bold, while confirmation messages relating only to instructive information may be in italics.

A representation of confirmation information may include an indication of a category of the confirmation information. Some examples of categories of confirmation information are discussed herein and may also include:
(i) promotional information
(ii) instructive information
(iii) cost information
(iv) information relating to features
(v) information relating to changes to a rule
(vi) information relating to a change to a game parameter Confirmation information may be output using an output device. Examples include:
(i) An LCD screen may display text representation of confirmation information.
(ii) A CRT monitor may display a video confirmation message to a player.
(iii) An audio speaker may output an audio representation of confirmation information.

According to various embodiments, the method of the invention may include one or more of the following steps:

(i) determining a representation of confirmation information
(ii) identifying a representation of confirmation information
(iii) selecting a representation of confirmation information
(iv) generating a representation of confirmation information
(v) creating a representation of confirmation information
(vi) determining how to present confirmation information
(vii) determining what way to present confirmation information
(viii) determining a manner of presenting confirmation information Note that determining a representation of confirmation information may include one or more of the following:
(i) determining a media format for the confirmation information (e.g., text, audio, video)
(ii) determining a language for the confirmation information (e.g., Chinese, German)
(iii) determining a presenter for the confirmation information (e.g., a celebrity, an animated character)
(iv) determining a partition for the confirmation information (e.g., a pop-up window, a sidebar)
(v) determining at least one visual cue the confirmation information (e.g., color, highlighting, font)
(vi) determining a category for confirmation information A confirmation message that is output to a player may be determined based on a variety of factors. Some general categories of factors include:
(i) content of the confirmation information
(ii) characteristics of the player
(iii) other confirmation messages
(iv) indications provided by the player
(v) indications provided by other parties (e.g., a casino representative, a friend of a player)
(vi) time-related factors
(vii) activities by a player Note that these categories of factors are also factors listed for trigger conditions and are discussed in detail below in the text describing trigger conditions. To avoid repetition, these categories of factors are not discussed in detail here.

Figure 12:
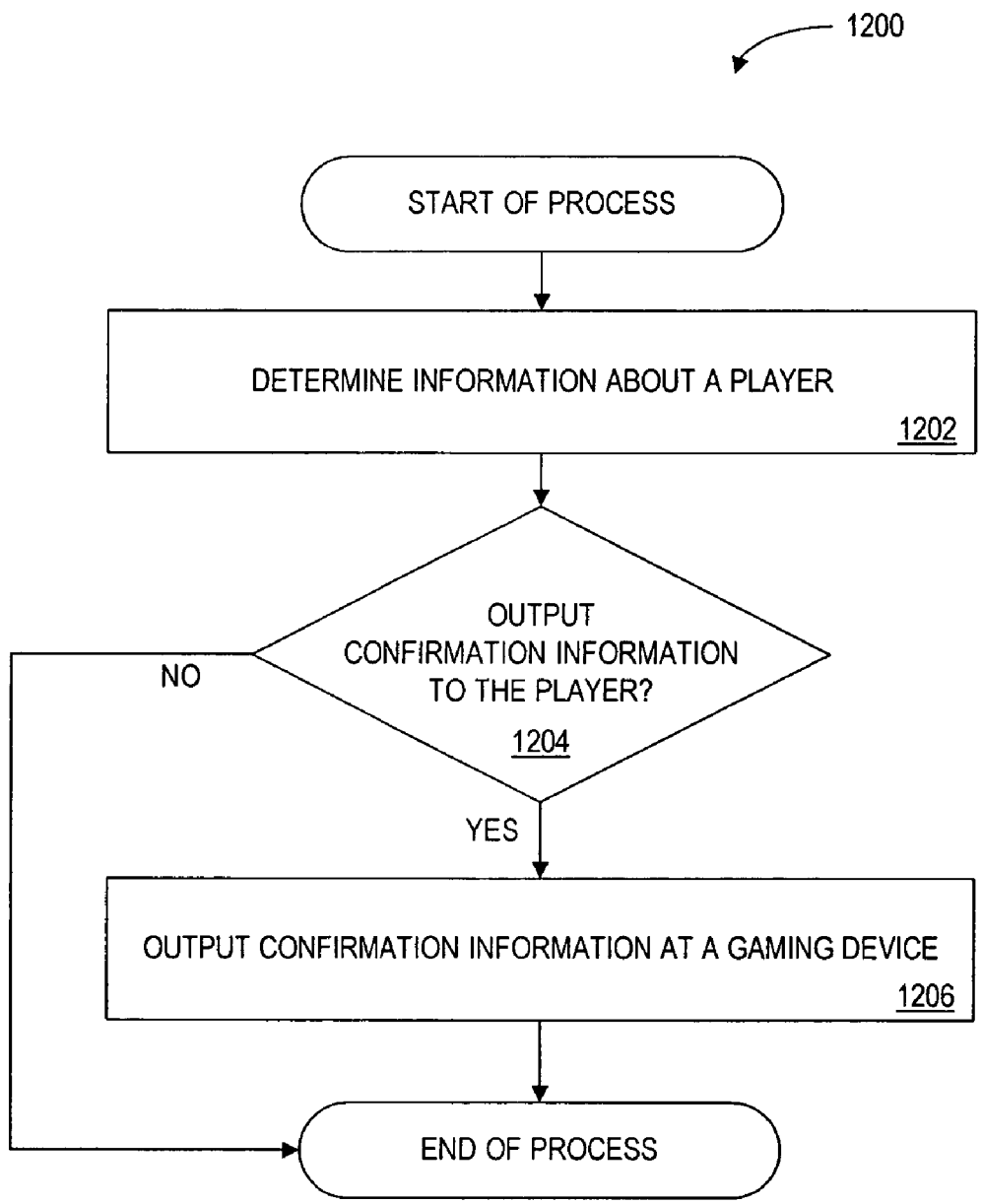
FIG. 12 is a flow chart illustrating an example process according to some embodiments of the present invention.

The controller may store confirmation information representation database 324, such as the one shown in FIG. 12. Note that, for any given confirmation message, one or more representations may be available. For example, PROMO-1-85923475 is available as an English text version, a Spanish text version, and an English audio version. Determining a representation for confirmation information may include selecting a representation from the confirmation information representation database.

The controller may store an optional message formatting database. Information stored in a message formatting database may be useful in formatting confirmation information to generate a representation of the confirmation information (e.g., a confirmation request). For example, the message formatting database may indicate (e.g., in a record) that a preferred representation of features on game machines for player "PLAYER-1-02834555" is to have the confirmation information output in a header with a green border and confirmation information title of "Would you like to proceed?" Note that there may only be one representation of confirmation information, in which case the controller may simply output the representation of the confirmation information to a player at a gaming device.

Referring now to FIG. 14, depicted therein is an example screen of confirmation information that may be displayed at a gaming device (e.g., at slot machine 104) to a player if a triggering condition has occurred, in accordance with one embodiment.

The two possible responses listed at the bottom of the screen allow the player to respond to the confirmation request by touching a touch-sensitive location on the screen.

As discussed variously herein, some types of confirmation messages may only contain a request that the user indicate whether he wants to proceed with play (e.g., "Would you like to start now?"; "Do you understand how the game is played?"). Some types of messages may include information about some or all of the rules of the game. Still other types of messages may include information about a cost of a game ("This game will cost you 20 credits.").

In some embodiments, a confirmation message may indicate any number of possible responses. For example, a third option might be "Yes, I will play—but please walk me through a two minute game demo first."

Some embodiments allow for a player to request additional information. For example, the player may be able to respond to a confirmation request by asking for additional information about the cost and/or one or more rules. In one or more embodiments, a player may be presented with an option to receive an instruction book for the game (e.g., "No thanks, but please print an instruction book for me to review later"). Depending on the desired implementation, the player may be able to request an instruction book whether or not he wishes to proceed with play or indicates he understands how the game is played.

According to some embodiments, instructions for a game could be printed via a cashless gaming receipt printer of the gaming device 104. The instruction book may comprise, for example, a comic book relating how the game is played, or a series of storyboards describing how the gaming device works.

Additional examples of outputting messages and representing information for confirmation by a player, as well as appropriate ways for their use in practicing various methods of the present invention, are described in U.S. patent application Ser. No. 10/685,143 (incorporated by reference). Other examples of confirmation screens and confirmation messages are described herein, and still others will be understood by those having ordinary skill in the art in light of the present disclosure.

4.1.3. Determining a Response

In step 1104, a response to the confirmation message is determined. In some embodiments, after a message is output at a gaming device, the player may respond or react to the message. Responding to a message may include:

(i) providing an indication
(ii) indicating a response
(iii) inputting a response
(iv) accepting an offer Accordingly, a method of the invention may include one or more of the following steps:

(i) determining a response by a player
(ii) receiving a response from a player
(iii) receiving an indication of a response from a player The player may respond or react to a confirmation message in various ways, including:

(i) acknowledging that the message was received (e.g., pressing an "OK" or "Continue" button on a touch screen)
(ii) removing, hiding, or deleting the message (e.g., closing or minimizing a pop-up window that displays the message)
(iii) accepting or declining an offer (e.g., pressing an "I accept, double the number of symbols!" button on a touch screen)
(vi) requesting additional information (e.g., "Please give me more information about how carrots disappear.")
(vii) indicating an opinion about the message (e.g., "I don't need to see any more instructions.")
(viii) storing the message for later review A player may respond to a message using a game machine. Examples include:

(i) A player may use an input device (e.g., a touch screen) on a game machine to indicate his response to a message.
(ii) A player may speak a response (e.g., by saying "Yes" or "No") and a voice recognition module on a game machine may process the response.
(iii) A game machine may present a list of possible responses to a player and a player may select at least one response from the list.

A player might not respond to a confirmation message, or may not respond in a manner the game machine 104 can interpret or understand. Thus, in some embodiments, determining a response may comprise determining that the player has not provided a response, determining that no response was received by the gaming device, and/or determining that a valid response was not indicated. Various actions may be taken based on a player not responding to a message, including:

(i) outputting the message again
(ii) outputting the message again in a different representation
(iii) outputting a different message
(iv) hiding, removing, or otherwise concealing the message. For example, a pop-up window that displays a message may automatically be closed if a player does not respond to the message.

If a player does not respond to a confirmation message, an action (e.g., outputting a second message, closing a pop-up window) may be performed based on a trigger condition. Examples include:

(i) A pop-up window for a message may be closed automatically when a player starts a new game on a game machine (e.g., the player presses the spin button)
(ii) A message may be removed from a header on a video screen after 15 seconds (a time-based trigger condition)
(iii) A sidebar window on a game machine may display one message at a time.
(iv) A first message may be hidden from view when a second message is output.
(v) An audio message may be output again if a player does not respond to the message within 15 seconds.

According to some embodiments, if no response (or an improper response) is received for a confirmation message, then play of a game will not be initiated. According to some additional or alternative embodiments, if no response (or an improper response) is received for a confirmation message, then a wager will not be accepted from a player (e.g., the credit balance of the player will not decremented). For example, before initiating game play and/or before accepting a wager from a player, some casinos may find it appropriate to require that a user respond affirmatively (e.g., provide some indication) that the user would like to proceed with play, understands on or more rules, is informed of a rule change, etc.

According to one embodiment, a slot machine 104 receives a selection from the player (e.g., a "Yes" or "No") in response to a confirmation message. For instance, referring to the example confirmation screen above, the player selects the "Yes, I'll play" button by touching the appropriate location on the confirmation screen. Of course, as described herein, a player could use a physical button on the console of the gaming device, or verbally respond "Yes," for example.

Some embodiments of the present invention provide for a default response. For example, if the player takes more than sixty seconds to respond, the game machine may automatically assume that the answer is "No." The game machine may then go back into an attract mode or wait for another triggering condition to occur. In some embodiments, when the player presses the cashout button, or removes his player tracking card from the player tracking card reader, it is assumed that the player does not wish to proceed or does not understand the game (i.e., a negative response is assumed).

Additional examples of responses to a message and determining such responses appropriate for use in practicing various methods of the present invention are described in U.S. patent application Ser. No. 10/685,143 (incorporated by reference). Other examples of responses are described herein, and still others will be understood by those having ordinary skill in the art in light of the present disclosure.

4.1.4. Determining Whether to Initiate Play

In step 1108, the system determines whether to initiate play at the gaming device. Determining whether to initiate play of a game may be based on the response determined in step 1106. Various types of responses are discussed herein. According to some embodiments, as discussed herein, a confirmation message comprises a prompt to a player to indicate whether or not he understands confirmation information provided in the message, and/or whether he would like to proceed with play (e.g., to start or continue a gaming session). Play may be initiated, for example, if a player responds affirmatively to a confirmation request by indicating acceptance or approval of the information communicated, or indicating a desire to proceed with play. For example, if a player's response to a confirmation message indicates that he would like to proceed with play, that he understands or authorizes the cost of the game, that he understands how long the game may take to play (e.g., for a game comprising multiple spins), and/or that he understands a rule of the game, then the gaming device may determine that play should proceed. In some embodiments, play may not be permitted unless the player responds affirmatively that he would like to proceed and/or that he understands the rules of the game.

In another example, if a player responds to a confirmation message by indicating that he would not like to proceed with play, or that he does not approve of or understand some of the information in the confirmation message, then the gaming device may determine that play will not be initiated. In this way, the system may help a player avoid committing to play of a game that may be confusing or frustrating to the player or might require a larger wager than the player feels comfortable with. If play is not initiated, then processing may then return to wait for a trigger condition to occur (step 1102). Optionally, a message may be output to a player (e.g., "Would you like some additional information?"; "Would you like to place a smaller wager?").

4.1.5. Initiating Play

In step 1110 play at the gaming device is initiated. For example, the slot machine presenting the example confirmation screen discussed above might now remove the confirmation information from display and begins normal game play.

For example, the player might then be able to press a "Spin" button in order to engage a set of reels to generate the next outcome. In some embodiments, game initiation may not require any action (or additional action) by the player. For example, the player may have already hit a "Start game" or "Spin" button that triggered the output of the confirmation message. In another example, some types of games may not require more or any input by the player (or may have at least one stage that does not require input by the player). For instance, the player may simply watch as the game plays out and collect any coins won during the game and/or at the end of the game.

According to some embodiments, in addition to or in lieu of generating an outcome, initiating play may comprise decrementing a credit balance of a player, or otherwise accepting a wager from the player. For example, if the player has positively affirmed the confirmation information, a gaming device 104 may decrement the credit balance stored in the gaming device by the total cost of the session.

Note that in embodiments where games are not prepaid, but are paid for on a per-spin basis, a player's credit balance may be decremented by the cost of one handle pull, and then decremented by the same amount for each subsequent handle pull as long as the game conditions remain the same (e.g., the number of paylines activated and the wager per payline stay the same).

After play of the game is initiated, the exemplary method 1100 ends. Alternatively, the system (e.g., the gaming device 104) may return to step 1102 to await the occurrence of another trigger condition.

4.2. Exemplary Player Information Process

Referring now to FIG. 12, a flowchart illustrates a process 1200 that is consistent with one or more embodiments of the present invention. The process 1200 is a method for outputting confirmation information based on information about a player. For illustrative purposes only, the process 1200 is described as being performed by a slot machine. Of course, the process 1200 may be performed by a controller 102, a gaming device 104, a peripheral device 210, a peripheral device server 216, and/or a casino or casino personnel.

In step 1202 the slot machine determines information about a player. As discussed herein, the slot machine may determine information about a player based on a player identifier (e.g., received from a player tracking card). The slot machine may use the player identifier to retrieve information from a player database, such as may be stored at the slot machine or at a slot server. For example, the slot machine may transmit the player identifier to the slot server and receive information about the player from the slot server. In another example, the player tracking card may include information about the player (e.g., one or more player preferences, experience level, number of times the player tracking card has been used) that may be used in determining whether to output a confirmation message to a player.

Many types of player information are discussed herein (e.g., with respect to player database 418), and other types of information will be readily apparent to those having skill in the art in light of the present disclosure. For example, player information may include one or more of: an experience level of the player; a gaming history of the player; a number of games the player has played in a session; a number of times the player has played a particular game, type of game, or type of gaming device; a total amount wagered; an average amount wagered (e.g., per gaming session, per handle pull); a total coin-in amount; gross winnings; net winnings; and the like.

According to some alternative embodiments, as discussed herein, in addition to or in lieu of determining player information, confirmation information may be output at a gaming device based on information about a game (e.g., the prepaid cost of a game; the level of difficulty of a game).

In step 1204, the slot machine determines whether to output confirmation information to the player. As discussed herein, this may comprise determining what type of confirmation information, if any, to output to the player. Various ways of determining whether to output confirmation information are discussed herein. For example, based on information determined about the player, such as the player's relatively high level of experience, the slot machine may determine that a confirmation screen is not necessary. In another example, based on a player preference to always receive a confirmation screen if the cost of the game is above a particular threshold, the slot machine may determine to output a confirmation page to the player.

According to some embodiments, the controller 102, a peripheral device 210, or peripheral device server 214 may transmit a signal to the slot machine to output a confirmation message and thus may control the slot machine to output a message. For example, a slot server may determine that a confirmation screen should be displayed to the player (e.g., based on the confirmation criteria database 420) and sends a signal to the slot machine. In other embodiments, the slot machine has received or otherwise has determined information about the player and determines whether to output information based on confirmation criteria or indications of trigger conditions stored at the slot machine. As discussed herein, determining whether to output confirmation information may include determining whether to suppress a confirmation message (e.g., based on a level of experience of the player; based on a preference of the player).

If no information is to be output (e.g., based on a player preference related to suppression), then the process ends. Otherwise, if the slot machine determines to output information, in step 1206 the slot machine outputs confirmation information at the slot machine (e.g., using a component display device; via an audio speaker). Various ways of outputting information are discussed herein. For example, the slot machine may retrieve information from the confirmation information database 324 for communicating to the player. After outputting the information, the process ends.

4.3. Other Examples

The following examples illustrate some additional embodiments and features of the present invention. The following examples are provided merely to illustrate some embodiments of the present invention, and should not be construed as limiting the scope of the invention in any way. Various other embodiments and examples of embodiments are discussed in further detail herein, and others will be apparent to those skilled in the art in light of the present disclosure.

4.3.1. Example

Confirmation Trigger

According to one or more embodiments of the present invention, a confirmation trigger may be used to determine when to present a confirmation screen to a player. The following exemplary scenario involves a confirmation trigger. A player inserts a bill into a bill validator of a slot machine and establishes a balance of eighty credits. He chooses to play a game in which the object is to assemble a twelve-piece puzzle within twenty-five spins of the reels. The game may pay credits during some of the twenty-five spins, but most of the payback in the game comes at the end, in the form of bonuses that are based on how much of the puzzle has been completed. The game requires a prepayment of twenty coins for each payline activated. The player chooses to activate three paylines. Before the machine subtracts the sixty credits (twenty credits multiplied by three paylines), however, game machine presents a confirmation screen to the player because the total (prepaid) cost will be greater than fifty coins. The determination that the cost exceeds fifty coins is thus acts as a trigger to have the gaming machine display the confirmation screen. The exemplary confirmation screen presents a simplified set of instructions for the game, and also includes two touch-sensitive locations at the bottom of the screen, labeled "Yes" and "No," respectively. The player is to use the selectable buttons to indicate whether or not he wants to go ahead and pay the sixty credits for the prepaid session. According to this exemplary scenario, the player had not realized that the game was of a prepaid format. Accordingly, the player selects the "No" button. In response, the machine automatically cashes out the player's eighty credit balance.

Alternatively, the game machine may not have automatically cashed out the player's credit balance, and may have allowed the player to select fewer paylines, review instructional information, and/or select a different game.

4.3.2. Example

Confirmation Suppression

According to one or more embodiments of the present invention, output of confirmation information may be suppressed (e.g., in accordance with a suppression condition). The following example involves confirmation suppression. According to the example, an experienced slot machine player sits down to his favorite "Pirate Treasure Game machine" and inserts $40 to establish a balance of one hundred sixty credits with the gaming device. She inserts her player tracking card into the player tracking card reader of the gaming device in order to identify herself to the network. The "Pirate Treasure Game" is a prepaid game and costs ten credits for each line played. The player selects a five-line version, and the gaming device calculates the corresponding total cost of fifty credits. Before displaying any confirmation information, however, the gaming device first checks with the slot server to determine whether or not the player is an experienced player. A record corresponding to the player and stored in a player database indicates that she has played nearly twenty-five hours on five-reel gaming devices featuring prepaid games (e.g., as stored in a field of the record). The amount of experience of the player satisfies an exemplary suppression rule or condition (e.g., stored in a database) indicating that messages are not to be provided to players having more than fifteen hours experience on games of that type. Based on this information, the output of the confirmation information is suppressed. The player begins the game and 50 credits are deducted from his credit balance. Before determining whether the player is an experienced player, the gaming device may have first determined that a confirmation message might be necessary (e.g., based on a confirmation trigger related to the total cost, as discussed in the example above).

4.3.3. Example

Confirmation of Rule or Parameter Change

According to one or more embodiments of the present invention, a gaming device may be operable to confirm a player's understanding of a rule change and/or to request that a player agree to begin or continue play when a rule has changed. A rule change may include a change to one or more game parameters, for example. In another embodiment of the present invention, the confirmation information serves to allow the player to confirm what parameter values will govern the game session. In some embodiments, the player may be able to approve or confirm a change to a parameter value.

Some examples of game parameters include, without limitation:

(i) Number of game symbols to start a session with (e.g., a number of carrots that a player is awarded as an initial starting value in a game spanning a number of spins)
(ii) Number of game symbols retained and/or collected by a player during a session (e.g., the number of carrot symbols that a player currently has)
(iii) Number of game symbols available for play (e.g., the number of fox symbols appearing on a reel of a slot machine)
(iv) Multiplier values of payouts (e.g., all payouts over the next ten spins multiplied by some value)
(v) Maximum number of spins allowed before a player is ineligible for a puzzle completion bonus
(vi) Number of reels used in a game
(vii) Number of bonus symbols on each reel that initiate a bonus round
(viii) Rate of expiration of collected cherry symbols (e.g., a player might be paid ten coins for each cherry accumulated over a twenty-five spin game, but the cherries gradually lose value after every handle pull—the expiration rate could be based on the number of credits in lost value per handle pull, for example)
(ix) Rate of accumulation of comp points
(x) Progression rate of a progressive jackpot
(xi) Payout for certain outcomes such as "ORANGE-ORANGE-ORANGE"
(xii) Probability of certain outcomes such as "BAR-BAR-BAR"
(xiii) Amount of wager required per spin
(xiv) Probability of a player getting into a bonus round
(xv) Number of puzzle pieces that need to be collected by a player during a puzzle game
(xvi) Probability of bonus round payouts being made (e.g., the ratio of treasure chests that award one or more coins compared to the number of chests that contain no coin awards)

Almost any game parameters may be modified by the player, by game events, and/or by the gaming device. Some parameter changes might require the player to pay more money. Some parameter changes may enable the player to collect additional coins.

According to some embodiments, a player might identify one or more parameters to change (e.g., by selecting from a menu of options). In other embodiments, the process of changing one or more game parameters (which would require confirmation by the player) could be triggered by actions of the player and/or triggered by game events. Such triggers may include, without limitation:

(i) Player loses more than X spins in a row
(ii) Player gets X "close calls" in a row (e.g., two of the reel symbols match)
(iii) Player loses more than $X in Y minutes/handle pulls
(iv) Player deposits more than $X into the machine
(v) Player speeds up play
(vi) Player slows down play The following example involves a request by a gaming device that a player agree to and/or indicate understanding of a rule change. According to the example, a player inserts a bill into the bill validator of a slot machine and establishes a balance of eighty credits. The player chooses to play a game in which he is allocated a number of carrots, which populate a virtual garden represented on a secondary game screen. The carrots are periodically stolen by a rabbit game character. The animated rabbit steals a carrot every time a rabbit symbol appears on the payline of one of the reels. The game costs twenty credits, and the player is allowed to spin until all of his carrots are stolen. After the player chooses the game, the gaming device displays confirmation information to the player, prompting the player to indicate whether or not the player understands that the game requires a prepayment of twenty credits. The player presses a "Yes" button to indicate that he understands the cost of the prepaid session.

Continuing with the exemplary scenario, the gaming device then asks the player (e.g., in a pop-up message window) whether or not he would like to pay an additional seven credits in order to start the game with twice as many carrots, pay an additional three credits to double the number of fox symbols (which scare away the rabbits) on the third reel, or pay an additional ten credits for both options. The player accepts both of the offered options (e.g., by pressing a corresponding button or buttons). Because the player has agreed to the rule changes, the slot machine displays another page of confirmation information to the player in order to confirm that the player understands the changes made to the game play and understands the cost of the wager (which has increased). This second exemplary page of confirmation information conveniently indicates the basic cost of the game (twenty credits), the cost of the options selected by the player (seven and three credits, respectively), and a summary of the starting game parameter values (indicating twice the ordinary number of starting carrots and twice the ordinary number of fox symbols on the third reel). A total cost of thirty credits is also displayed at the bottom of the confirmation screen, along with text asking the player to "Press 'Yes' if you agree to the above changes or 'No' to cancel this game." The information provided to the player thus made it clear what had changed from the basic game. The player selects a "Yes" button and the game begins after subtracting thirty credits from the player's established credit balance. Thus, in this exemplary scenario, the player received two confirmation messages. The second confirmation screen prompted the player to confirm rule changes desired by the player, as well as the new total cost of the game that would be required based on the requested changes.

The preceding example was explained as taking place before play of a session began. Some embodiments of the present invention allow for a player to request a change to a parameter value at any time during play. In one example, in the middle of a prepaid game a player may decide that he wants to pay more money in order to double the number of fox symbols appearing on the third reel (i.e., fox symbols in this exemplary game are helpful to the player). The player requests the change (e.g., by pressing a corresponding button). The slot machine may display to the player: "You have requested to double the number of fox symbols (active through the end of the prepaid game) for an additional payment of 5 credits. Do you agree to this change in the game?" If the player accepts, the number of fox symbols is updated and the game continues.

4.3.4. Example

Game Instruction Book

According to one or more embodiments of the present invention, a gaming device may provide instructive information about a game to a player in the form of an instruction book or other printed matter. The following example involves the outputting of an instruction book by a game machine. According to the example, a player inserts a bill into the bill validator of a slot machine and establishes a balance of eighty credits. The player chooses to play a game in which the goal is to win an election for President of the United States. The game requires a prepayment of twenty coins for each payline activated by the player. The player chooses to activate three paylines, but before the machine subtracts the sixty credits, it presents a confirmation screen to the player (e.g., because the total cost will be above fifty coins). The confirmation screen includes the cost and instructions for the game. The player understands that it is a prepaid game and that the prepaid cost will be sixty credits, but the player is confused by some of the rules of the game indicated on the confirmation page. Accordingly, the player decides to select the "Cancel" button on the gaming device. After receiving the indication that the player does not want to play, the machine then asks the player whether he would like to receive a printed set of instructions for the game. The player is about to go eat lunch, so he decides to get the offered instruction book. The cashless gaming receipt printer connected to the slot machine prints out an instruction book for the game, in the form of a series of storyboards. The player takes the printout and reviews it while waiting for lunch. The instruction book includes sample screens from the game, with brief explanatory text. The player quickly understands how the game is played, has a better idea of what he might experience during the game, and has a better understanding of how long the game might take to play. The player is excited to get back onto the casino floor to try it out.

5. ADDITIONAL EMBODIMENTS

As discussed herein, some embodiments of the present invention provide for outputting a confirmation message based on a wager amount. For example, a player may establish a balance of funds (e.g., by providing currency to a slot machine). The slot machine determines the wager amount required for play, and determines whether the required amount is greater than a predetermined threshold amount (e.g., as indicated in confirmation criteria database 420). If it is greater, then the slot machine confirms the amount with the player. In some respects, this type of confirmation is similar to that of a consumer checking out at an on-line merchant site. In other words, the player is offered the opportunity to review the price or cost of what he intends to purchase (e.g., one or more game plays).

According to some embodiments, a confirmation message may include an indication of the player's available balance. In some cases, the message may also include an indication of the required wager compared to the balance. For example, the wager may be expressed as a percentage of the available balance, or the player may be told: "The wager for this game is a large portion of your balance! Are you sure you want to continue?"

According to one or more embodiments, if a player elects not to proceed (i.e., does not confirm), the slot machine may automatically cash out the player's balance of credits.

According to some embodiments, the gaming device uses one or more tests to determine whether or not the player is paying attention when he is presented with (or is agreeing to) information displayed on a confirmation information page. For example, the player might be asked to touch the "Yes" button three times in quick succession in order to confirm his intention to proceed. In another example, the player is asked to touch three locations in numeric order, rather than location order. For instance, the gaming device displays the number "2," "1," and "3" and requests that the player touch the numbers in numeric order rather than touching from left to right. Thus, confirmation information may include information about how to respond to a confirmation request. Such requirements may help to ensure that the player pays attention when responding to the confirmation information. Such tests may also be helpful in discouraging intoxicated players from playing gaming machines.

In those embodiments in which additional security is desired, a player might be required to initial one or more locations on the confirmation information screen in order to indicate confirmation. For example, he might be required to trace out his initials on a touch screen area adjacent to the total coin cost that he was agreeing to. Such initials could be stored within the gaming device or at the slot server for later review. According to some embodiments, audit information could be stored for all accepted confirmations (e.g., in a database), for example, with a corresponding time/date and player identifier associated with each.

In addition to providing a "Yes"/"No" response to displayed confirmation information, players might be required to present biometric information as well. For example, a player choosing to play a game costing more than one hundred credits might be required to place his thumb onto the screen in order to capture a thumbprint. The thumbprint might then be stored within a storage device (e.g., memory 312) of the gaming device for later retrieval (e.g., in case of a player dispute). Alternative biometrics include a voice print (e.g., a player says "Yes" in addition to touching the "Yes" button) or having the player give an "OK" sign to one of the security cameras in the area. Other types of biometrics and devices for use in receiving and storing biometric data will be understood by those of skill in the art in light of the present disclosure.

According to some embodiments, a player may be required to "qualify" to play a game. Players might be asked questions, for example, to test their knowledge or understanding of a how the game is played. In an election game, for example, the player might be presented with various rules of the game on the confirmation information page. After confirming his intention to play (e.g., by pressing the "Yes" button), the gaming device might ask a series of multiple choice questions to verify that the player had reviewed the game rules included on the confirmation screen. Simple questions could be asked of the player, such as "How many credits are required to play this game?" Failure to answer one or more questions correctly might result, for example, in the player being required to watch a tutorial sequence, or outputting of the same confirmation page, followed by another series of questions.

As discussed herein, players reviewing confirmation information could be offered the opportunity to get more information about any one of the information items displayed. For example, the confirmation information page might indicate that the game involves an election in which the player must win a majority of three state regions in order to win the state. If the player is confused, in lieu of or in addition to indicating that he does not wish to continue, he could be allowed to touch or click on (e.g., using a pointer device) a statement that he does not understand, bringing up more textual information or perhaps a short video clip demonstrating that particular game rule (much like a hyperlink).

In some embodiments, the confirmation information page may also include a "Call" button which could summon casino personnel to explain a particular feature or cost to a player.

Marketing information may also be included in a confirmation message. For example, players might be informed that if they activate one more paylines, they will be eligible for a bonus payout or double comp points. According to some embodiments, it may be advantageous to use a confirmation information screen to promote other offerings of a casino property, such as restaurants, shows, and shopping.

Although various embodiments are described herein as being directed to information about a game, confirmation messages could include requests to confirm any type of information. For example, a confirmation screen could be displayed to a player during a game in order to confirm that the player has a dinner reservation within fifteen minutes.

Confirmation information might take the form of a warning or reminder to the player, and may not request or require a response or signal of confirmation. For example, whenever the player inserts a bill into the bill validator of a machine which offers prepaid games, confirmation information may be displayed, such as "Reminder—this is a prepaid game with a minimum of 25 reel spins. It requires initial funding of at least 20 credits to play."

Various embodiments of the present invention contemplate applications to table games, such as blackjack, roulette, or craps. In the game of blackjack, for example, a player might indicate to the dealer that he always wants insurance whenever he has a hand of eighteen or better against a dealer Ace. In such an embodiment, a peripheral device could be attached to the table. The device could allow the player to electronically indicate that he accepts the rule (i.e., that he wishes to play in accordance with the rule). In a video poker embodiment, for example, confirmation information could include a screen asking the player to confirm the number of hands that he wanted to play in a fifty-play video poker game. In addition, a description could be displayed of the number of wild cards in the deck, or the difference in payout between a natural royal flush and a royal flush containing wild cards.

According to some embodiments of the present invention, a player's response to a confirmation request may include the player providing a signature. For example, the player may provide a signature using a stylus on a touch screen of the gaming device, or using a peripheral device, such as those used at point-of-sale terminals for providing authorization for credit card charges. The signature may be stored electronically for auditing purposes. In another example, the player may provide a written signature on a printed substrate. For instance, the gaming device 104 may output a confirmation form using a cashless gaming receipt printer. The player may then use the form to indicate his response (e.g., by marking an appropriate check box) and/or to provide his signature. This form could then be provided to casino personnel at a slot club desk or change booth. Alternatively, the form may be inserted back into the machine via a cashless gaming receipt acceptor. In this way the form may be retained for future reference if a dispute arises regarding whether the player provided confirmation.

While the method and apparatus of the present invention have been described in terms of its presently preferred and alternate embodiments, those skilled in the art will recognize that the present invention may be practiced with modification and alteration. The specifications and drawings are, accordingly, to be regarded in an illustrative rather than a restrictive sense. Further, even though only certain embodiments have been described in detail, those having ordinary skill in the art will certainly appreciate and understand that many modifications, changes, and enhancements are possible within the scope of the accompanying claims. All such modifications are intended to be encompassed within the following claims.

What is claimed is:

1. A gaming apparatus comprising:
a processor operable to facilitate a wagering game;
an input device in communication with the processor; and
a computer readable medium in communication with the processor and storing instructions configured to direct the processor to perform a method comprising:
determining a balance of funds for a player;
receiving a signal indicating a wager amount selected by the player for placement on the wagering game by the player;
after receiving the signal indicating the wager amount selected by the player for placement on the wagering game by the player and before accepting the wager amount for the wagering game, determining that the wager amount selected is greater than a predetermined amount associated with a triggering condition for presenting a confirmation message to the player before accepting the wager amount, wherein the predetermined amount is distinct from a minimum wager amount that may be required to play the game;
in response to determining that the wager amount selected is greater than the predetermined amount, displaying a confirmation message, such that the wager amount selected is not accepted until at least the confirmation message is displayed;
receiving a signal initiated by the player via the input device after displaying the confirmation message, the signal indicating that the player desires to place the wager amount after receiving the confirmation message; and
after receiving the signal indicating that the player desires to place the wager amount after receiving the confirmation message, accepting the wager amount and initiating play of the wagering game.

2. The gaming apparatus of claim 1, in which the game comprises a plurality of plays.

3. The gaming apparatus of claim 1, in which the game comprises a flat rate session.

4. The gaming apparatus of claim 1, in which the game comprises a prepaid session.

5. The gaming apparatus of claim 1, in which the wager amount selected corresponds to a plurality of plays.

6. The gaming apparatus of claim 1, in which the wager amount selected corresponds to a predetermined period of time.

7. The gaming apparatus of claim 1, in which the confirmation message comprises a confirmation screen.

8. The apparatus of claim 1, in which the confirmation message includes a representation of the wager amount as a percentage of the balance of funds.

9. The apparatus of claim 1, in which the confirmation message includes an indication of the wager amount compared to the balance of funds.

10. The apparatus of claim 1,
in which the confirmation message includes a representation of a ratio of the wager amount to the balance of funds.

11. The apparatus of claim 1, in which determining that the wager amount required is greater than a predetermined amount comprises:

determining an indication of the wager amount as a percentage of the balance of funds.

12. The apparatus of claim 1, in which the predetermined amount corresponds to a predetermined ratio.

13. The gaming apparatus of claim 7, in which the confirmation screen comprises at least one selectable location.

14. A gaming device comprising:

a processor operable to facilitate a wagering game;

a first input device in communication with the processor;

a second input device in communication with the processor; and a computer readable medium in communication with the processor and storing instructions configured to direct the processor to perform a method comprising:

receiving a request to initiate a handle pull of the wagering game at the gaming device, wherein the request to initiate a handle pull comprises a game initiation signal generated by the first input device in response to a player actuating the first input device;

after receiving the request to initiate the handle pull and before initiating the handle pull:

determining a cost to play the wagering game, determining that the cost to play the wagering game is greater than a predetermined cost associated with a triggering condition for presenting confirmation information to the player, wherein the predetermined cost is distinct from a minimum wager amount required to play the game, determining to present confirmation information to the player in response to determining that the cost to play the wagering game is greater than the predetermined cost, determining confirmation information to present to the player, determining an available balance of the player for the wagering game, presenting the confirmation information to the player, in which the confirmation information includes an indication of the cost to play the game as a percentage of the available balance, and receiving a signal initiated by the player via the second input device in response to the presenting of the confirmation information to the player, the signal indicating that the player confirms the confirmation information and desires to initiate the handle pull of the wagering game;

decrementing a credit balance associated with the player; and after receiving the signal indicating that the player confirms the confirmation information, initiating the handle pull of the wagering game at the gaming device.

15. A non-transitory computer readable medium storing instructions configured to direct a processor to perform a method comprising:

determining a balance of funds for a player;

receiving a signal indicating a wager amount selected by the player for placement on the wagering game by the player;

after receiving the signal indicating the wager amount selected by the player for placement on the wagering game by the player and before accepting the wager amount for the wagering game, determining via a gaming device that the wager amount selected is greater than a predetermined amount associated with a triggering condition for presenting a confirmation message to the player before accepting the wager amount, wherein the predetermined amount is distinct from a minimum wager amount that may be required to play the game;

in response to determining that the wager amount selected is greater than the predetermined amount, displaying a confirmation message, such that the wager amount selected is not accepted until at least the confirmation message is displayed;

receiving a signal initiated by the player via the input device after displaying the confirmation message, the signal indicating that the player desires to place the wager amount after receiving the confirmation message; and after receiving the signal indicating that the player desires to place the wager amount after receiving the confirmation message, accepting by the gaming device the wager amount and initiating play of the wagering game.

16. The apparatus of claim 12, in which the predetermined ratio is not less than one half.

* * * * *